(12) United States Patent
Bramblet et al.

(10) Patent No.: US 7,382,895 B2
(45) Date of Patent: Jun. 3, 2008

(54) TAILGATING AND REVERSE ENTRY DETECTION, ALARM, RECORDING AND PREVENTION USING MACHINE VISION

(75) Inventors: John W. Bramblet, Vashon, WA (US); Carl R. Witty, Renton, WA (US); Seth Michael LaForge, Seattle, WA (US)

(73) Assignee: Newton Security, Inc., Renton, WA (US)

( * ) Notice: Subject to any disclaimer, the term of this patent is extended or adjusted under 35 U.S.C. 154(b) by 774 days.

(21) Appl. No.: 10/410,884

(22) Filed: Apr. 8, 2003

(65) Prior Publication Data

US 2004/0017929 A1     Jan. 29, 2004

Related U.S. Application Data

(60) Provisional application No. 60/370,837, filed on Apr. 8, 2002.

(51) Int. Cl.
    *G06K 9/00*     (2006.01)
(52) U.S. Cl. .................................................. 382/103
(58) Field of Classification Search ............ 348/385.1, 348/159, 169, 387.1, 43, 150, 152, 153, 154, 348/155, 167, 44, 135, 143, 144, 148, 149; 382/103, 100, 291, 104, 191, 286, 318, 154; 340/541, 545.1
    See application file for complete search history.

(56) References Cited

U.S. PATENT DOCUMENTS

| 3,564,132 | A | * | 2/1971 | Baker et al. ................. 348/156 |
| 3,727,034 | A | | 4/1973 | Pope |
| 4,000,400 | A | | 12/1976 | Elder |
| 4,303,851 | A | | 12/1981 | Mottier |
| 4,799,243 | A | | 1/1989 | Zepke |
| 4,847,485 | A | | 7/1989 | Koelsch |
| 5,201,906 | A | | 4/1993 | Schwarz et al. |
| 5,519,784 | A | | 5/1996 | Vermeulen et al. |
| 5,581,625 | A | | 12/1996 | Connell |
| 5,866,887 | A | | 2/1999 | Hashimoto et al. |
| 6,081,619 | A | | 6/2000 | Hashimoto et al. |

(Continued)

FOREIGN PATENT DOCUMENTS

EP     0 706 062 B1     4/1996

(Continued)

*Primary Examiner*—Tung Vo
*Assistant Examiner*—Behrooz Senfi
(74) *Attorney, Agent, or Firm*—Christensen O'Connor Johnson Kindness PLLC

(57) ABSTRACT

Unauthorized entry into controlled access areas using tailgating or reverse entry methods is detected using machine vision methods. Camera images of the controlled area are processed to identify and track objects in the controlled area. In a preferred embodiment, this processing includes 3D surface analysis to distinguish and classify objects in the field of view. Feature extraction, color analysis, and pattern recognition may also be used for identification and tracking of objects. Integration with security monitoring and control systems provides notification when a tailgating or reverse entry event has occurred. More reliable operation in practical circumstances is thus obtained, such as when multiple people are using an entrance or exit under variable light and shadow conditions. Electronic access control systems may further be combined with the machine vision methods of the invention to more effectively prevent tailgating or reverse entry.

54 Claims, 19 Drawing Sheets

U.S. PATENT DOCUMENTS

| | | | |
|---|---|---|---|
| 6,493,878 B1* | 12/2002 | Kassatly | 725/144 |
| 6,720,874 B2* | 4/2004 | Fufido et al. | 340/541 |
| 2002/0070858 A1* | 6/2002 | Gutta et al. | 340/541 |
| 2003/0002712 A1* | 1/2003 | Steenburgh et al. | 382/103 |
| 2003/0107649 A1* | 6/2003 | Flickner et al. | 348/150 |

FOREIGN PATENT DOCUMENTS

| | | |
|---|---|---|
| EP | 0 847 030 A2 | 6/1998 |
| JP | 05-067264 | 3/1993 |
| WO | WO 96/38820 A1 | 12/1996 |
| WO | WO 98/08208 A3 | 2/1998 |

* cited by examiner

TAILGATING AND REVERSE ENTRY DETECTION, ALARM, RECORDING AND PREVENTION USING MACHINE VISION

CROSS-REFERENCE TO RELATED APPLICATION

This application claims the benefit of the filing date of U.S. Provisional Application No. 60/370,837, filed Apr. 8, 2002, the entire disclosure of which is incorporated herein by reference.

FIELD OF THE INVENTION

The present invention relates to detection, alarming, recording and prevention of unauthorized entry at entrances, doors, gates, passages, and the like. More specifically, this invention relates to application of machine vision methods to the detection, alarming, recording and prevention of tailgating (also known as piggybacking) and/or reverse entry events.

BACKGROUND OF THE INVENTION

Tailgating (also known as piggybacking) is a significant problem in a wide variety of security and access control applications. Tailgating or piggybacking is the entry into or out of a controlled area or through a controlled access portal of more persons, objects or vehicles than are allowed by access control rules. For example, a tailgating event occurs when persons, generally on foot or in a vehicle, attempt to gain access to an area for which they do not have the required credentials. Another example of tailgating occurs when an unauthorized person on foot or in a vehicle attempts to follow a person (again on foot or in a vehicle) with proper access credentials into a controlled access area. A variation on this approach is for the unauthorized person on foot or in a vehicle to attempt to enter the controlled access area when an authorized person (in a vehicle or on foot) leaves the area.

Another example of tailgating (or piggybacking) is where a person sits on the shoulders of another person or is carried in some other way by the other person into the controlled access area. In all of the foregoing, the participation of the authorized individual may be inadvertent, voluntary, or coerced. In the remainder of this document, these cases and other similar cases are referred to as tailgating.

A related problem arises where someone attempts to enter on foot or in a vehicle through an "exit only" access point. This unauthorized use of an exit portal can be referred to as reverse entry. This access control violation arises, for example, when a person attempts to gain access to a controlled area using the exit of a one-way elevator (an elevator intended to be accessible only from inside the controlled area), escalators (by running the wrong direction), one-way revolving doors, or an exit passage. Alternatively, persons on foot may attempt to enter a controlled area by going over or under a gate at a vehicle-only entry or exit point. These methods and related events are collectively referred to herein as reverse entry.

The consequences of tailgating and reverse entry can vary widely. For example, the consequences may be purely economic as in the case of a successful perpetrator gaining access to an event venue, transportation or other such area without paying the admission or fare. Operators of entertainment venues, sporting facilities, parking facilities and transportation systems typically wish to prevent revenue loss from unauthorized entrants. In other cases, a successful perpetrator may steal something of value from the controlled area. Operators of industrial and manufacturing facilities, warehouse and other storage facilities, and housing areas, such as apartments or hotels, wish to prevent loss from theft. In yet other cases, a successful perpetrator may cause serious damage to property or harm to individuals in the controlled area. Airports, facilities handling hazardous materials, power plants and other utility facilities and large public places need to prevent the entry of persons wishing to cause property damage or harm to other people. To achieve these goals, it is necessary that doors, gates, passageways and other entry or exit areas be protected against unauthorized entry by perpetuators using tailgating and reverse entry methods.

Prior art access control systems have a long history starting with human guards and various types of mechanical locks. Modern access control systems use a wide variety of technologies and methods, including mechanical keypad or cipher locks, electronic keypad or cipher locks, contact-based or contactless smart cards or smart tokens (generally employing radio frequency or infrared communications), magnetic strip cards, and biometric control methods, such as retinal scans, fingerprint or handprint identification, facial feature identification, and voice print identification. Known access control methods do not prevent tailgating or reverse entry on their own. Moreover, human guards and persons authorized to access a controlled area may assist the perpetrators willingly or unwillingly, further complicating the situation.

Prior art approaches to the problems of detecting tailgating or reverse entry have not been successful. Most prior art approaches have applied either visible light or infrared break-beam technology. U.S. Pat. No. 3,727,034 to Pope, for example, discloses a system employing a pair of break-beams to determine the direction a person is traveling and count the number of people traveling through a passageway. U.S. Pat. No. 4,000,400 to Elder discloses a system applying a similar approach that also uses a pair of break-beams. These approaches suffer from a number of well-documented problems. If multiple people or vehicles pass the break-beam pair at the same time traveling in the same or opposite directions, the system cannot detect or resolve the ambiguity. People can crawl under or jump over a pair of break-beams. A person with another person on their shoulders or being carried in some other way is not detected. Since the break-beam requires a light source directly opposite the detector, the break-beam cannot be affected by the swing of a door. Architectural modifications may thus be required for installation. The above systems also disclose no provision for interfacing with external access control or other security systems. Further, the optical break-beams may not work in high ambient light conditions.

U.S. Pat. No. 5,519,784 to Vermeulen discloses a system that attempts to overcome some of the deficiencies of break-beam systems by employing an array of four or more sensors at floor level. However, this approach cannot detect cases where a person carrying another person on their shoulders or in some other way passes through the array. A four-legged animal passing through the array will likely trigger a false alarm. Architectural modifications may be required to force each person to pass through each beam. In addition, the system disclosed has no provision for interfacing with external access control or other security systems. Finally, as noted before, optical break-beams may not work in high ambient light conditions.

U.S. Pat. No. 4,303,851 to Mottier discloses a system using a pair of video cameras focused on two adjacent tracks through a flat mirror and connected to counter circuits. The tracks are perpendicular to a person's direction of travel. Persons passing through this array are detected and counted. While this approach removes some of the ambiguities associated with break-beam methods, problems still remain. A person with another person on their shoulders or being carried in some other way is not detected. The system disclosed has no provision for interfacing with external access control or other security systems. Further, architectural modifications may be required to keep all persons within the field of view of the cameras and to prevent the swing of a door from interfering with the field of view of the cameras.

U.S. Pat. No. 4,847,485 to Koelsch and U.S. Pat. No. 4,799,243 to Zepke disclose systems applying arrays of pyroelectric infrared sensors to directionally count people entering or leaving through a passage. The system in U.S. Pat. No. 4,799,243 employs a single linear array of sensors that may not detect a person with another person on their shoulders or being carried in some other way. Further, it is unclear whether several people entering or leaving in close physical proximity would be correctly detected. U.S. Pat. No. 4,847,485 attempts to overcome these deficiencies through the use of multiple sensor arrays. This approach has the drawback that it requires architectural modifications since each person must be forced to walk through all the arrays. The systems disclosed have no provision for interfacing with external access control or other security systems. Further, architectural modifications may be required since the swing of a door cannot affect the area monitored by the sensors. Both systems are also subject to environmental restrictions since they use pyroelectric sensors and are unsuitable for vehicle entrances.

U.S. Pat. No. 5,866,887 to Hashimoto et al. discloses a system that applies a similar approach but uses a moving sensor and pattern recognition to reduce both the cost and the ambiguity inherent in detecting multiple people at the same time. This system does not overcome all the aforementioned deficiencies, since the approach still relies on sensing biomass though detection of body heat of people.

U.S. Pat. No. 5,201,906 to Schwarz et al. discloses a system that applies a set of ultrasonic sensors in a revolving door structure. The sensors are interfaced to a local access control system to prevent or detect piggybacking. The ultrasonic sensors determine if more than one person is in one compartment or more than one compartment is occupied. This approach requires architectural modifications to most facilities, since a revolving door is required. The rate at which people can pass through the revolving door is likely less than a conventional door with security access. Further, this approach is unsuited for vehicle entrances.

U.S. Pat. No. 6,081,619 to Hashimoto et al. discloses a system that employs either linear or angular infrared distance or range-finding arrays. This approach has drawbacks in that some embodiments require architectural modifications since each person must be forced to walk through the array, and the observation area of the sensors cannot be affected by the swing of a door. The system disclosed has no provision for interfacing with external access control or other security systems. Finally, this system is subject to environmental restrictions since it uses infrared technology and is unsuitable for vehicle entrances.

The use of simple motion detection video is known in the security technology industry. Motion detection video uses frame-differencing and related methods applied to the output of a video camera. These methods suffer from problems such as changes in lighting and shadowing. Overlapping objects are often difficult to separate since there is no depth (three-dimensional) analysis and no attempt is made to analyze and track individual objects.

U.S. Pat. No. 5,581,625 to Connell discloses a system that uses a pair of stereoscopic video cameras and associated machine vision analysis to separate individual objects (e.g., people) in a line that partially overlap from the perspective of the stereo camera pair. This system makes no attempt to determine the motion of the people observed. Furthermore, there is no provision for interfacing the system with external access control or other security systems.

SUMMARY OF THE INVENTION

The present invention overcomes the deficiencies of prior art systems by using advanced machine vision methods and providing optional integration with access control systems and other security apparatus. Unlike prior art systems, preferred embodiments of the present invention do not require modification of buildings or other facilities. Further, preferred embodiments of the invention provide more reliable operation in practical circumstances, such as when multiple people are using an entrance or exit and under variable light and shadow conditions.

Embodiments of the invention are preferably configured to operate on any type of entrance or exit, including those with doors, gates, passages, elevators, escalators, and the like. The invention may be applied to persons on foot, animals, vehicles, persons in vehicles, packages (e.g., parcels, luggage, etc.), and any other type of object entering or exiting a controlled access area. The invention can be used to monitor a single designated access point, such as an entry or exit point, or can be applied to any number of distributed entry or exit points at one or more controlled access areas.

Machine vision methods employed in preferred embodiments of the invention include three-dimensional (3D) surface analysis of objects in the image. This allows the system to distinguish and classify multiple objects that may overlap in the field of view or be observed under conditions of variable light and shadow. The system may use other machine vision methods, including feature extraction and pattern analysis and recognition, to enhance the identification and tracking of objects.

Systems constructed according to preferred embodiments may interface with a variety of electronic access control equipment, including electronic keypad or cipher locks, contact-based or contactless smart cards or tokens (generally employing radio frequency or infrared communications), magnetic strip cards, and biometric control methods, such as retinal scans, fingerprint or handprint identification, facial feature identification, and voice print identification. The systems may also employ machine vision methods to monitor doors, gates, elevators, passages, escalators, etc., with mechanical access control or no access control at all. The systems may further be used to provide supplemental automated monitoring of entrances and exits that are monitored by with human guards.

A preferred system of the invention can be fully integrated with security monitoring and access control systems. The integrated system provides audible and visible alarms to alert security personnel when a tailgating or reverse entry event has occurred. A preferred system of the invention also provides one or more video outputs from event monitoring cameras. These video outputs can be switched to display video of an incident scene for security personnel and to make a video record of the event. The video display and record may include textual and graphical information indicating the location of the incident, relevant personnel identification or access codes, and date and time, for example.

Ambiguous situations arising from objects that cannot be accurately classified by machine vision methods may signal an alert to security personnel to manually investigate the situation. An example of an ambiguous situation is where two people attempt to enter using only one access credential and throw a blanket or coat over their heads in an attempt to evade the system. Another example arises when a person enters with a large animal (e.g., guide dog). The system provides video that can be switched to a display to aid in resolution of the event.

There are several aspects of the invention, each of which may be used singly or in combination with the others when constructing a system according to the invention. One aspect is to use machine vision methods to detect and prevent unauthorized individuals employing tailgating or reverse entry methods from gaining access to a controlled area. Such tailgating or reverse entry methods may involve two or more persons on foot traveling in the same or different directions, persons in two or more vehicles traveling in the same or opposite directions, a single person attempting to enter through an exit only access point, a person using a vehicle entrance while on foot, etc. Machine vision methods that include stereo image analysis, feature detection, color analysis, and pattern recognition or matching, for example may be used to detect and prevent such unauthorized access.

Another aspect is to capture, route, display, and/or record event video and other information about a tailgating or reverse entry event, including identification of the person(s) involved (if known), date, time, location, etc. This data processing may be under the control of the machine vision processing system.

A further aspect of the invention is to prevent tailgating or reverse entry at one or more possibly remote locations with doors, gates, escalators, elevators, passages, and other entry and exit points without the need for architectural modifications of existing facilities.

Preferred embodiments of the invention are configured to operate with any available access control system, including human guards, electronic systems, and mechanical systems, through appropriate interfaces and using machine vision capability to monitor doors, gates, and other entrances or exits. The cost of employing machine vision methods may be reduced by using a single processing system to monitor multiple controlled areas through the use of video switching to share image processing capabilities. Moreover, other event information from sources, such as electronic access control systems and door or gate sensors, may be combined with the machine vision methods of the invention to more effectively prevent tailgating or reverse entry.

Yet another aspect of the invention is to provide built-in initialization, calibration, and on-going test methods, including continuous monitoring and analysis of a background image or scene using machine vision methods, including stereo image analysis, to ensure the integrity and accuracy of the machine vision system and to prevent attempts by perpetrators to alter the background.

Still another aspect of the invention is to provide a tailgating and reverse entry detection system with greater resistance to environmental conditions, including changing light and shadowing, through the use of electronic camera control, interactive user interface, and machine vision methods including feature extraction and stereo analysis. Interference from doors, gates, and other access limiting structures may be eliminated, regardless of the direction of opening or swing of the structures, particularly in embodiments where the cameras are placed above and beyond the reach of the access limiting structures.

It will be appreciated that the foregoing description of features and aspects of the invention are not intended to be exhaustive or to limit the scope, functionality, or operation of the invention.

BRIEF DESCRIPTION OF THE DRAWINGS

The invention will be described by reference to the embodiments described herein in conjunction with the drawings in which.

DETAILED DESCRIPTION OF PREFERRED EMBODIMENTS

The following detailed description refers to the accompanying drawings and describes exemplary embodiments of the present invention. Other embodiments are possible and modifications may be made to the embodiments described herein without departing from the spirit and scope of the invention. The section titles that follow are provided for convenience and are not meant to limit the invention.

First Embodiment

A first preferred embodiment of the invention uses a stereo pair of tracking cameras and a single event capture camera combined with machine vision processing to detect or prevent tailgating and/or reverse entry events.

Overview

Figure 1:
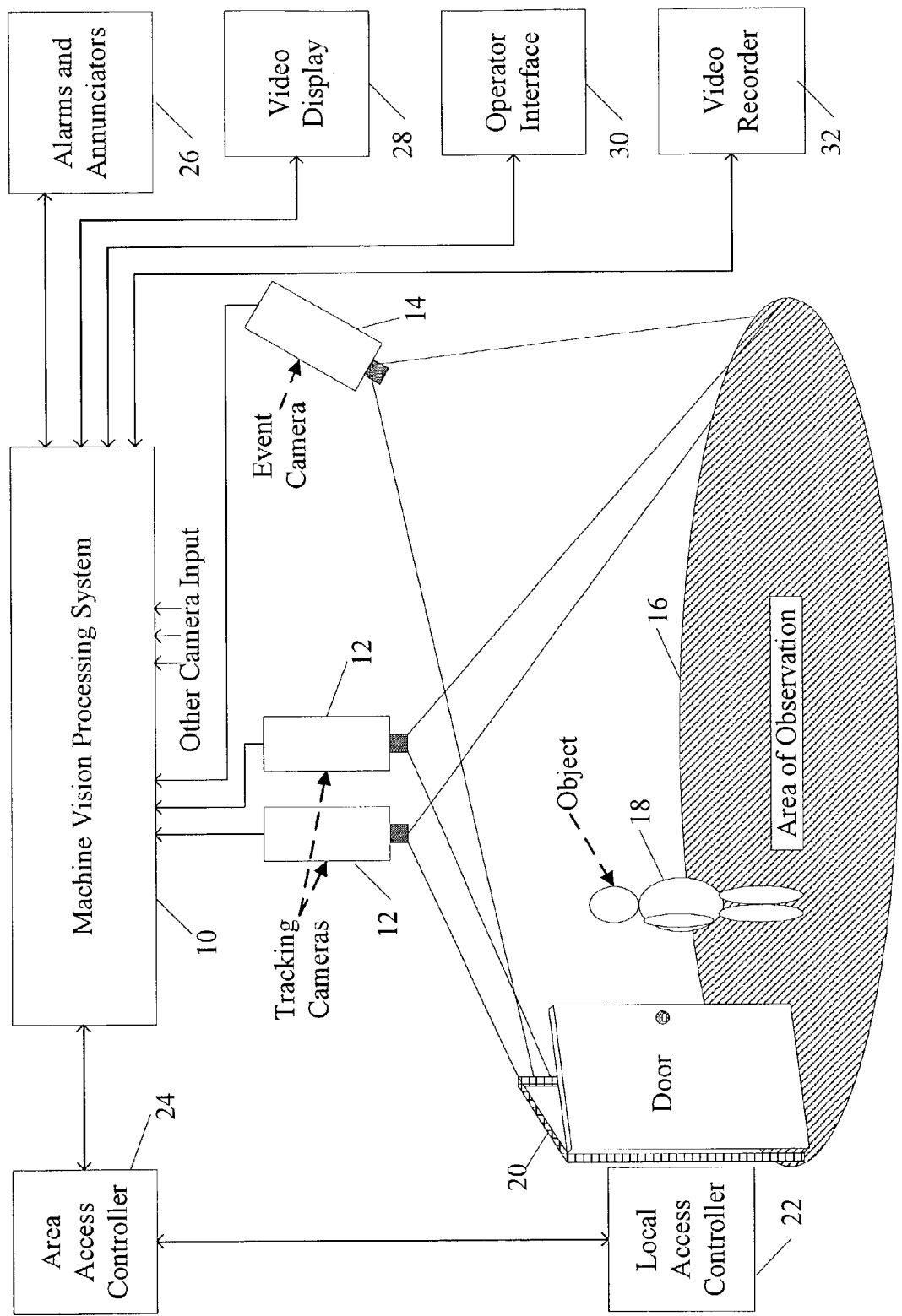
FIG. 1 is an overall block diagram of one preferred embodiment of a system constructed according to the invention.

A block diagram of the first embodiment of the invention is shown in FIG. 1. FIG. 1 depicts a machine vision processing system 10 that is capable of processing video images and detecting tailgating or reverse entry events. The machine vision processing system 10 receives video inputs from cameras, here a stereo pair of tracking cameras 12, and an event capture camera 14. Other camera inputs to the machine vision processing system 10 may be included if desired. The overlapping viewing area of these cameras is shown in FIG. 1 as an area of observation 16 in which objects 18 are identified, classified and possibly tracked by the machine vision processing system 10. Part of the area of observation 16 may optionally be defined by a door, gate, portal, elevator door, turnstile or other access limiting structure 20. It will be understood that the invention is applicable to any type of access limiting structure which people or objects can pass through, and which can include (but are not limited to):

1. One or more planar doors, possibly interlocking when closed, that open and close with hinges on the top, bottom or side, and are operated manually or automatically;

2. One or more planar doors, possibly interlocking when closed, that slide up, down or sideways, and are operated manually or automatically;
3. Folding or rolling doors, possibly interlocking when closed, that are operated manually or automatically;
4. One or more gates or doors, possibly interlocking when closed, that do not completely obstruct the opening or portal and may open in any manner, and are operated manually or automatically; and
5. Revolving structures, such as revolving doors or turnstiles, which partially of fully occupy the opening or portal and are operated manually or automatically.

Alternatively, the area of observation 16 can be in a passage, escalator or other limited access area that is not defined by an access limiting structure.

The stereo pair of tracking cameras 12 are preferably placed overhead of the area of observation 16, but may be placed at any convenient location with a clear view of the area of observation. Preferably, the stereo tracking cameras 12 are held in an adjustable bracket that allows their positions to be adjusted but maintains their alignment, and is sturdy enough not to move from these settings with time. Camera positions may be adjusted manually or by motor drive that is locally or remotely controlled. The event camera 14 is ideally placed at a location that gives a clear view of persons, vehicles or other objects in the area of observation 16. Brackets for the cameras may be attached to any solid surface, such as a ceiling or wall, and thus do not require architectural modification of the area. The cameras 12 and 14 can be of an analog or digital type. In a preferred embodiment, these cameras produce stereoscopic color images with two or more color-band Signals. Standard color cameras that produce images in three colorbands may be used for cost reasons.

The machine vision processing system 10 interfaces with an optional access control system such as area access controller 24 and one or more optional local access controllers 22. The area access controller 24 monitors and controls access at all designated access points, such as entry and exit points, to a particular controlled-area or areas. Centralized control and monitoring is often provided at a centralized security desk. Local access controllers 22 control one or more doors or other access limiting structures 20. The area access controller 24 may interface with the local access controllers 22 via wired or wireless communication of signals to maintain centralized control and monitoring of all access limiting structures 20 in the area or areas being controlled. Local access controllers 22 may include, for example, electronic keypad or cipher locks, contact-based or contact-less smart cards or electronic tokens (generally employing radio frequency or infrared communications), magnetic strip cards, and biometric control methods, such as retinal scans, fingerprint or handprint identification, facial feature identification, and voice print identification.

The area access controller 24 and local access controllers 22 may be configured to send access control information to the machine vision processing system 10. This data may include status of doors or other access limiting structures 20, data from other access monitoring systems such as breakbeams (not illustrated), and personnel identification or access codes. The machine vision processing system 10 may send control data or signals to the area access controller 24 or the local access controllers 22 to "lock down" a facility or to close a particular door or gate when a tailgating or reverse entry incident is detected.

The machine vision processing system 10 may further be provided with alarms and/or annunciators 26 which can include, for example, bells, sirens, machine-generated or recorded speech, lights, image displays, and text displays. The alarms and annunciators 26 may be local to the area of observation 16 or near the area access controller 24 or a centralized security desk. In some embodiments, the alarms and annunciators 26 may be connected to the area access controller 24 or the one or more local access controllers 22. In this case, the machine vision processing system 10 can send a signal to these controllers to trigger the alarms and annunciators. This alternative configuration does not change the scope, spirit or functionality of the invention.

The machine vision processing system 10 supplies video, typically from the event camera 14, incident data, and control data or signals to an optional video display 28 and optional video recorder 32. The video display 28 may be used by security or other personnel to observe the area of observation 16, especially when a tailgating or reverse entry incident is detected. The video display 28 may have the ability to receive multiple video signals and switch between the multiple video signals. When an incident arises, the machine vision processing system 10 preferably switches video produced by the event camera 14 at the scene of the incident for display on the video display 28. The video display 28 may include textual or graphical data describing the location of the incident and pertinent personnel identification or access codes. The video display 28 may be at a centralized security desk or at some local location. Preferably, video of a period of time before and after detection of an incident is preserved by the video recorder 32 for future reference. Incident data, including incident location, date, time, and personnel identification or access codes, may also be recorded.

The machine vision processing system 10 preferably interfaces with an operator interface 30. The operator interface 30 may be used by an operator to provide commands for configuring, initializing, calibrating, and testing of the machine vision processing system 10. Optionally, the operator interface 30 may provide a textual or graphical user interface for presenting data and command prompts to the operator. The user interface may be interactive and enable the operator to configure properties of the system, including properties of the image analysis, properties of the machine vision processing system, and properties of access control systems, such as the local and area access controllers.

Some embodiments of the invention may use different types of alarms for different situations. These alarms can have different audible and visual properties. Some possible examples of these different alarms can include:
1. A warning alarm that may be used in non-critical situations such as someone starting to travel in the wrong direction through a portal (but not yet violating the security policy);
2. An alarm specific to the type of security violation, such as tailgating, which may have distinctive audible or visible patterns; and
3. An alert indicating an unusual situation, such as people or objects traveling too close together, or an object in the area of observation that cannot be unambiguously identified.

Machine Vision Processing System

Figure 2:
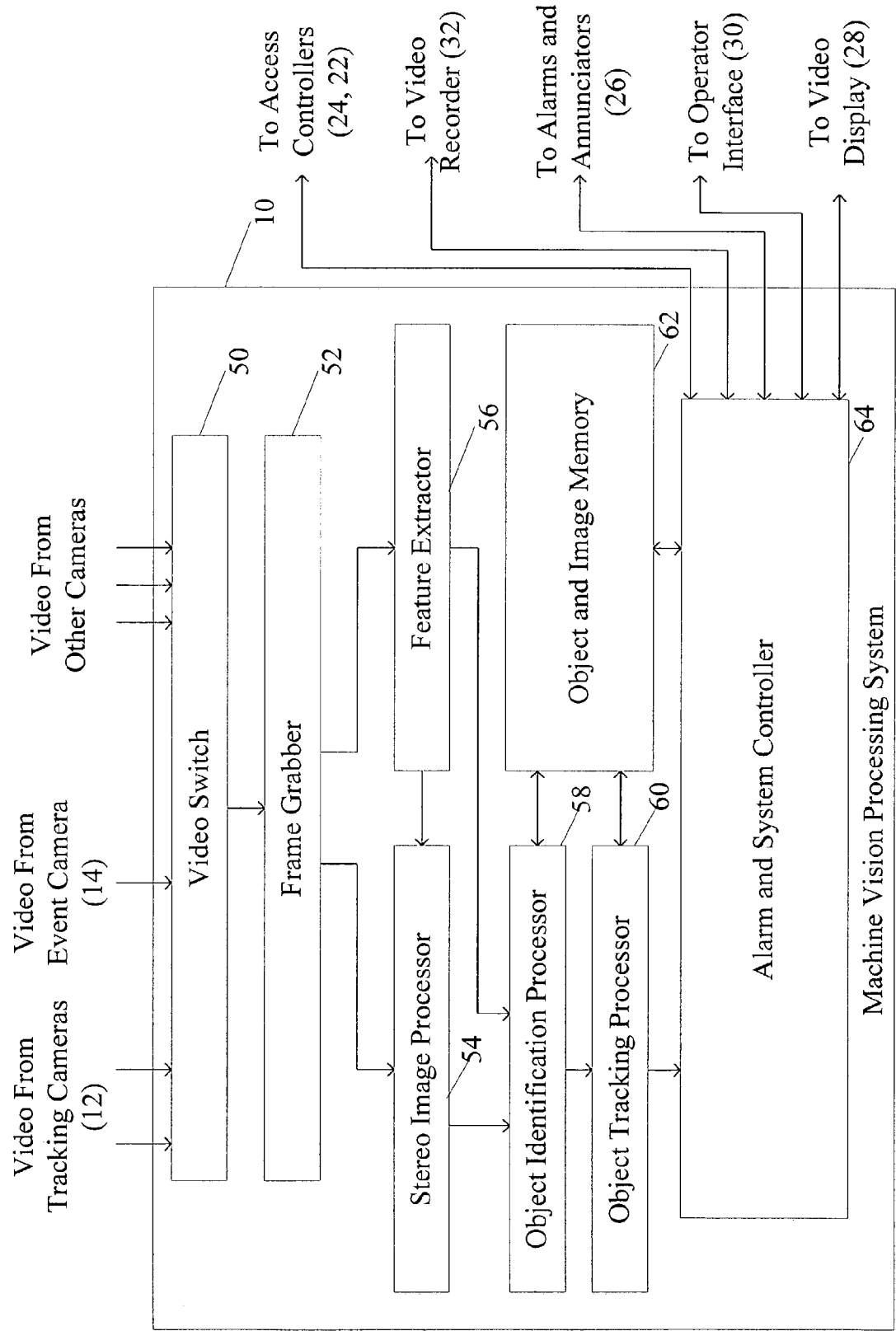
FIG. 2 is a block diagram of a machine vision processing system that may be used in the embodiment of the invention shown in FIG. 1.

FIG. 2 illustrates a block diagram of one suitable embodiment of the machine vision processing system 10. Other embodiments may include additional or fewer components than those shown in FIG. 2. Furthermore, in many applications, the machine vision processing system 10 may be housed in a single cabinet, but in other applications, it can be distributed in packaging or space. The machine vision processing system 10 may also be built using redundant components to resist failure, damage and tampering.

In the embodiment shown in FIG. 2, video input from the stereo tracking cameras 12 and the event camera 14 is received through a video switch 50. The video switch 50 may also receive input from other video cameras, possibly at other areas of observation. The video switch 50 feeds the video signals from the cameras to a frame grabber 52 where one or more video frames from the signals are captured and stored for processing. By switching between the different sets of cameras and capturing video signals on a frame-by-frame basis, the use of a video switch 50 reduces the cost of the frame grabber 52. The frame grabber 52 may need to accommodate only one input signal at a time. If analog cameras are used, the frame grabber 52 preferably digitizes the video images before storing them.

A stereo image processor 54 and feature extractor 56 operate on the image frames stored by the frame grabber 52. The stereo image processor 54 operates on the stereoscopic color images received from the stereo tracking cameras 12, and preferably performs 3D surface analysis of the objects 18 and background in the area of observation 16. Suitable methods for 3D surface analysis and background analysis are known, and can include those disclosed in U.S. Pat. No. 5,581,625 to Connell, the disclosure of which is entirely incorporated by reference herein. The stereo image processor 54 may also use input from the feature extractor 56. The feature extractor 56 identifies features such as edges and corners in images received from the stereo tracking cameras 12 and possibly the event camera 14. The stereo image processor 54 can use the feature information from the feature extractor 56 to test different hypotheses to the best stereo image depth map.

The outputs of the stereo image processor 54 and feature extractor 56 are fed to an object identification processor 58. The object identification processor 58 uses the 3D surface data and image features extracted from the images to identify and possibly also classify objects 18 in the area of observation 16. In one embodiment, the objects 18 are identified and classified using pattern recognition methods. Those skilled in the art will be fully familiar with many suitable techniques used for pattern recognition. Typically, pattern recognition involves company patterns in the 3D surface data and image features with equivalent data and features of known or previously-identified objects. A pattern match within a specified tolerance constitutes recognition of the pattern. The object identification processor 58 stores image and object data in the object and image memory 62. These data may include, but are not limited to: location (which can be defined by centroid computation or other suitable methods), depth, shape, color, size, and connection to other objects. Optionally, the object identification processor 58 may use object and image data stored in the memory 62 from previous video frames to aid in the identification and classification of objects. Correlation of the objects from image to image can be based on one or more properties of the object including, size, shape, or color. This may be useful in cases, for example, where a more certain identification of an object in one image can be used to identify the object in another image where the identification may be less certain.

Data is provided from the object identification processor 58 to the object tracking processor 60. Using the object and image data from the current frame and object and image data stored in the memory 62 from previous frames, the object tracking processor 60 maintains track records or track files of the objects 18 in the area of observation 16. Using this information, the object tracking processor 60 determines the trajectory and speed of objects 18 in the area of observation. The can be done, for example, where an object in an image is correlated with an object having the same or similar classification in one or more prior images and with motion along some expected trajectory, or where the motion from one image to the next is limited.

The object tracking processor 60 provides tracking information to an alarm and system controller 64. In a preferred embodiment, the alarm and system controller 64 applies access control rules to the object tracking data to determine if a tailgating or reverse entry event or other questionable incident has occurred. Alarm decisions may also be made by applying access control rules to data received from the access controllers 24, 22, which can include access credentials or access codes identifying the individual or individuals. The rules applied in any particular application of the invention for signaling an alarm may depend on the security regulations that are specified for the controlled area being protected. Examples of access control rules that may actuate an alarm include (but are not limited to):

1. More people or vehicles passing though the area of observation than is allowed under the rules, by the credentials or codes presented to the access controller, by one or more people. For example, some codes or credentials may allow one person to "host" any number of other persons through the area of observation, whereas some persons must pass through individually.
2. More people or vehicles passing though the area of observation than have been authorized by the access controller, based on credentials or codes presented.
3. Reverse entry situations (e.g., objects coming into an area of observation from an exit-only location).
4. Objects of unusual size or shape (possibly a person riding on the shoulders or being carried by another) passing through the area of observation.
5. Objects that cannot be well classified (unknown type) passing through the area of observation.
6. Door, gate, or other access limiting structure left open for longer than a threshold period of time.
7. The types of objects that are not allowed (i.e. a cart, a box, a wheel chair) for a person or object with a particular credential or code, when passing through the area of observation.
8. Objects of a type that are not allowed for any access credential or code (e.g., a person on foot using a vehicle only access or a person on a package-only conveyor belt) passing through the area of observation.

If one or more rules access control applied by the alarm and system controller 64 indicates an alarm situation, the alarm and system controller 64 alerts operators or security personnel as required using an interface to the alarms and annunciators 26. The alarm and system controller 64 may also initiate a display of video from the event camera 14 of the area of observation 16, possibly along with other event data, including location and access code or personnel identification, on the video display 28. Event camera video transmitted to the video recorder 32, possibly with associated data, including event location, date, time, and access code or personnel identification, may be preserved for future reference.

Operators and technical personnel using the operator interface 30 can interact with the machine vision processing system 10 though the alarm and system controller 64. The operator interface 30 provides commands for configuration, initialization, calibration, and testing of the alarm and system controller 64. Optionally, the alarm and system controller 64 can provide textual, audio and graphical information to the operator through the operator interface 30.

Those skilled in the art will be familiar with many machine vision methods that are well documented in the scientific and engineering literature. These methods may be employed by the video switch 50, the frame grabber 52, the stereo image processor 54, the feature extractor 56, the object identification processor 58, the object tracking processor 60, and the object and frame memory 62.

Process Flow

The first embodiment described herein processes data from one or more sets of the stereo tracking cameras 12 and possibly the event camera 14 on a frame-by-frame basis. The machine vision processing system 10 operates on the frame-by-frame image data to detect, announce, and where possible prevent, tailgating or reverse entry events. One exemplary process used by a machine vision processing system 10 as shown in FIG. 1 is described in FIGS. 3A, 3B, 3C, 3D, 3E, 3F, 3G, and 3H. It will be understood that the particular sequence and nature of the actions described can be altered without changing the spirit, function or capability of the invention.

Figure 3A:
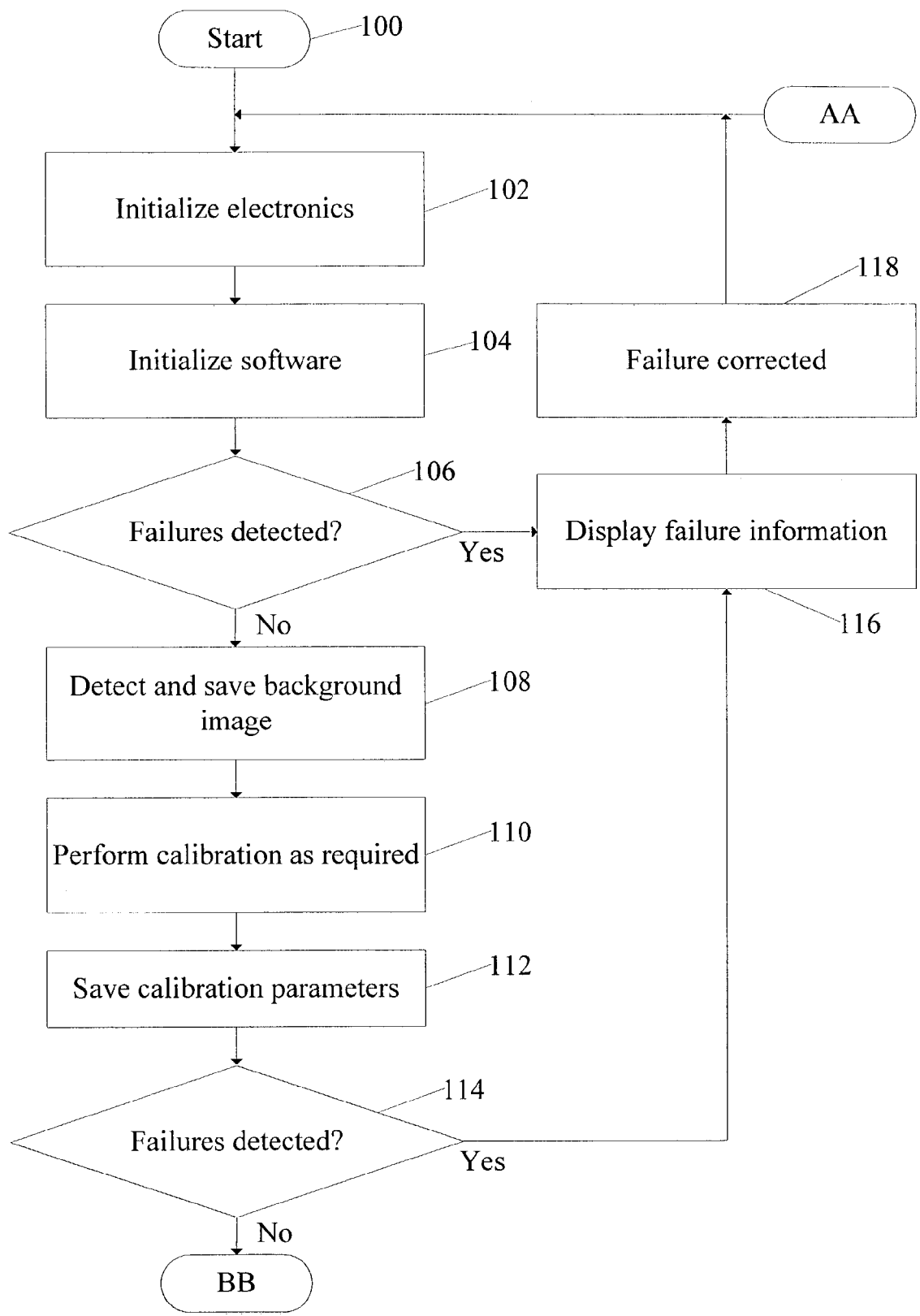
FIGS. 3A, 3B, 3C, 3D, 3E, 3F, 3G, and 3H depict process flow diagrams that may be employed by the embodiment of the invention shown in FIG. 1.

Turning first to FIG. 3A, at block 100 the machine vision processing system 10 starts processing, generally as a result of power-up, a boot event or other initialization event. The electronics are initialized at block 102, followed by software initialization at block 104. If, at block 106, faults or failures are detected during the initialization process, failure information is preferably displayed at block 116 to an operator using the operator interface 30. Generally, the information presented to the operator will be as diagnostic as possible to assist in correcting the failure or fault. In the case of a failure, the operator or other personnel may take corrective action at block 118 and attempt to start or initialize the system again at block 100. Examples of failures that may be detected on initialization or during on-going operation include:

1. Failure of one or more electronic components.
2. Failure of communications with the access controllers 24, 22, alarms and annunciators 26, video display 28, or video recorder 32.
3. Failure to receive correct signals from any of the cameras 12, 14.

Once the machine vision processing system 10 is initialized and determined to be operating properly, a background image for the stereo tracking cameras 12 and possibly the event camera 14 is detected and saved for reference at block 108. Alternatively, a previously detected and saved background image may be used. Objects in the background image are identified by the machine vision processing system 10 and noted as belonging to the background image. Accordingly, during run-time operation, new objects that appear in the area of observation 16 may be identified and classified separately from the background image.

Upon initialization, and periodically over time, a calibration procedure may be performed, as indicated at block 110. A typical calibration procedure involves moving a target of known size, shape and pattern across the area of observation 16 at different heights above the base surface or floor and collecting data with the stereo tracking cameras 12. Once the calibration data is collected, the operation of the cameras and object identification and tracking processing is verified and the calibration parameters are saved 112. If, at block 114, any failures are detected during the collection and saving of the background image (block 108) or the calibration process (block 110), information relating to the failure is displayed at block 116 to the operator using the operator interface 30. Generally, the information presented will be as diagnostic as possible to assist in correction of the failure or fault. In the case of a failure, the operator may take corrective action (block 118) and then attempt to start or initialize the system again (block 100).

Figure 3B:
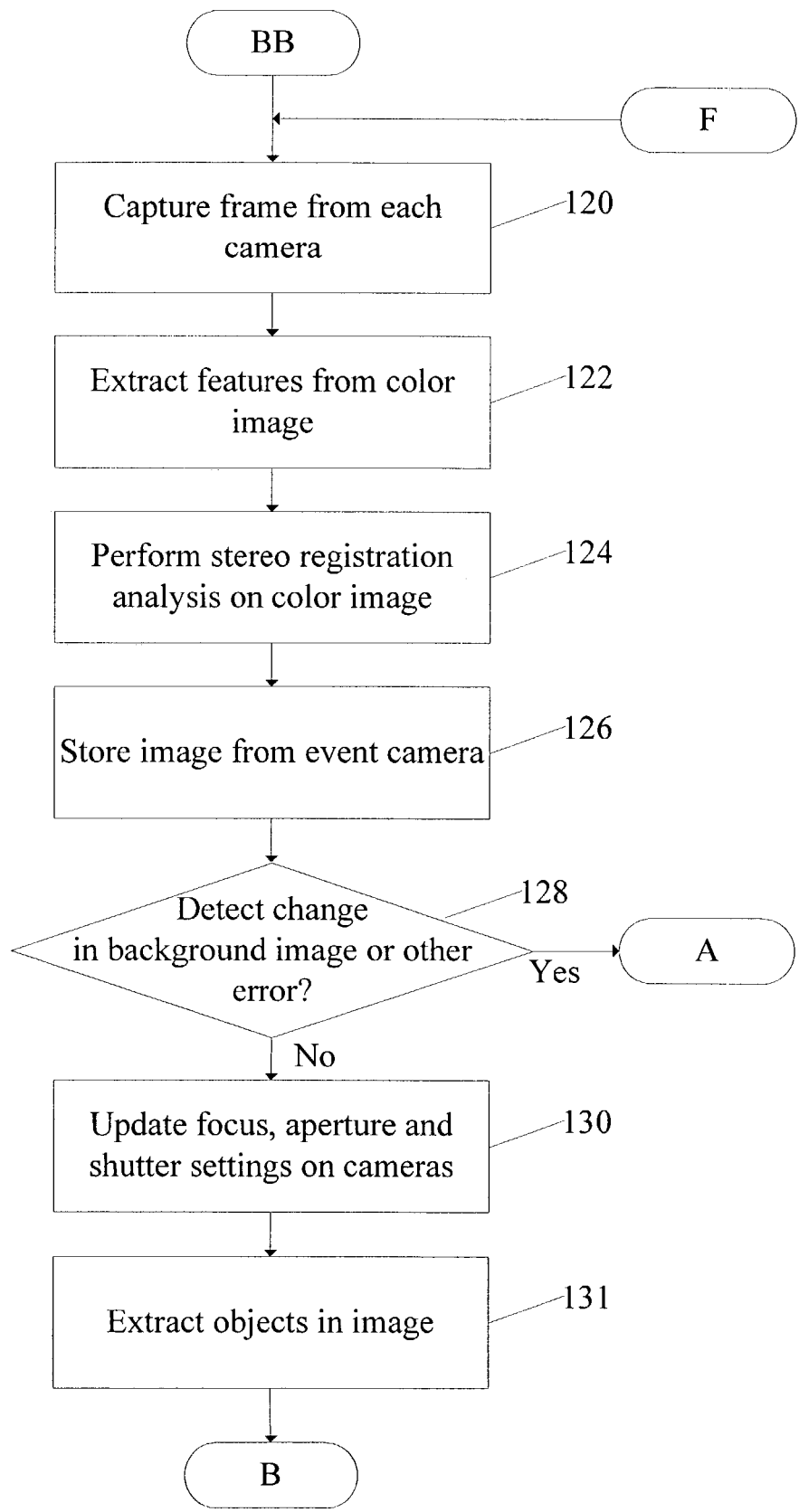

Turning now to FIG. 3B, once the machine vision processing system 10 is initialized and calibrated as required, the system 10 starts at block 120 to capture video frames from the one or more sets of stereo tracking cameras 12. Video from the event camera 14 may also be captured. Either during or after a set of frames is captured, image features are extracted at block 122 and stereo image analysis of the color image is performed at block 124. This may include methods such as those taught in U.S. Pat. No. 5,581,625, referenced earlier and incorporated by reference herein. At block 126, the image from the event camera is stored. At block 128, tests such as thresholding are applied to the stereo image analysis to determine if the background image has changed significantly. For example, objects in the background are identified in the image or depth map, and if they are not clearly visible, an alarm is sounded. This may occur, for example, if someone has covered one of more of the cameras. Changes in the background can indicate an attempt to alter the background by a perpetrator or an equipment failure. If required, the focus, aperture and shutter settings of the cameras may be electronically updated at block 130. The need for and availability of these settings is determined in large part by the particular model of cameras chosen.

Figure 3C:
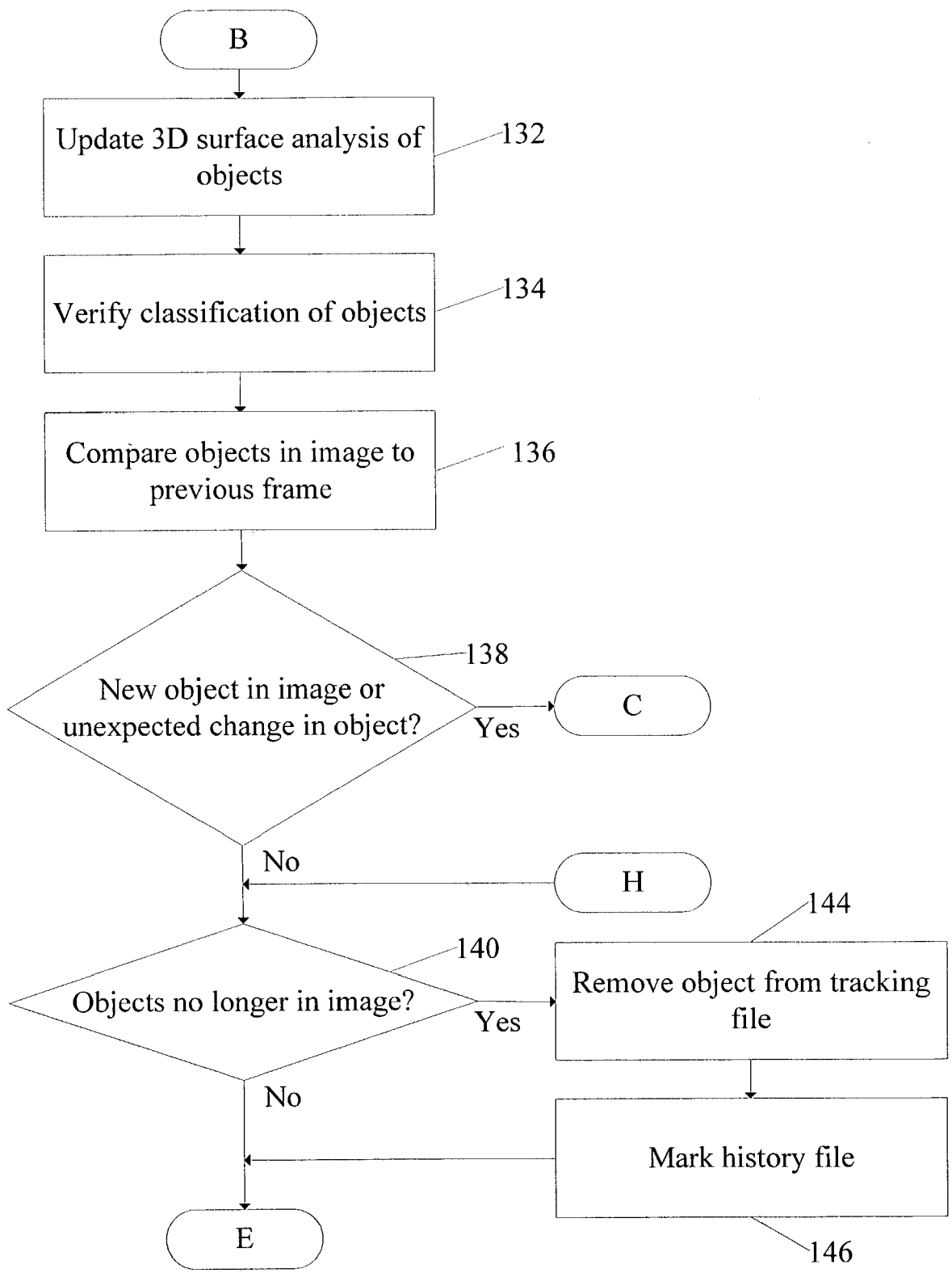

Using the image features extracted at block 122 and stereo image analysis performed at block 124, objects in the image, such as object 18 shown in FIG. 1, are extracted at block 131. If required by changes in the image or in the identified objects, a 3D surface analysis of the objects may be updated at block 132 (FIG. 3C). Classification of the objects may be verified at block 134 to ensure that the classification of the objects remains a good match. The objects identified in the current frame are compared to those identified in a previously collected frame, as shown at block 136. At block 138, the machine vision processing system 10 determines whether new objects appear in the image or if unexpected changes in any objects are detected. If objects seen in the previous frame are no longer observed in the current image, as determined at decision block 140, the data on these objects is removed at block 144 from the tracking file and the history file is marked at block 146 with the event as desired.

Figure 3D:
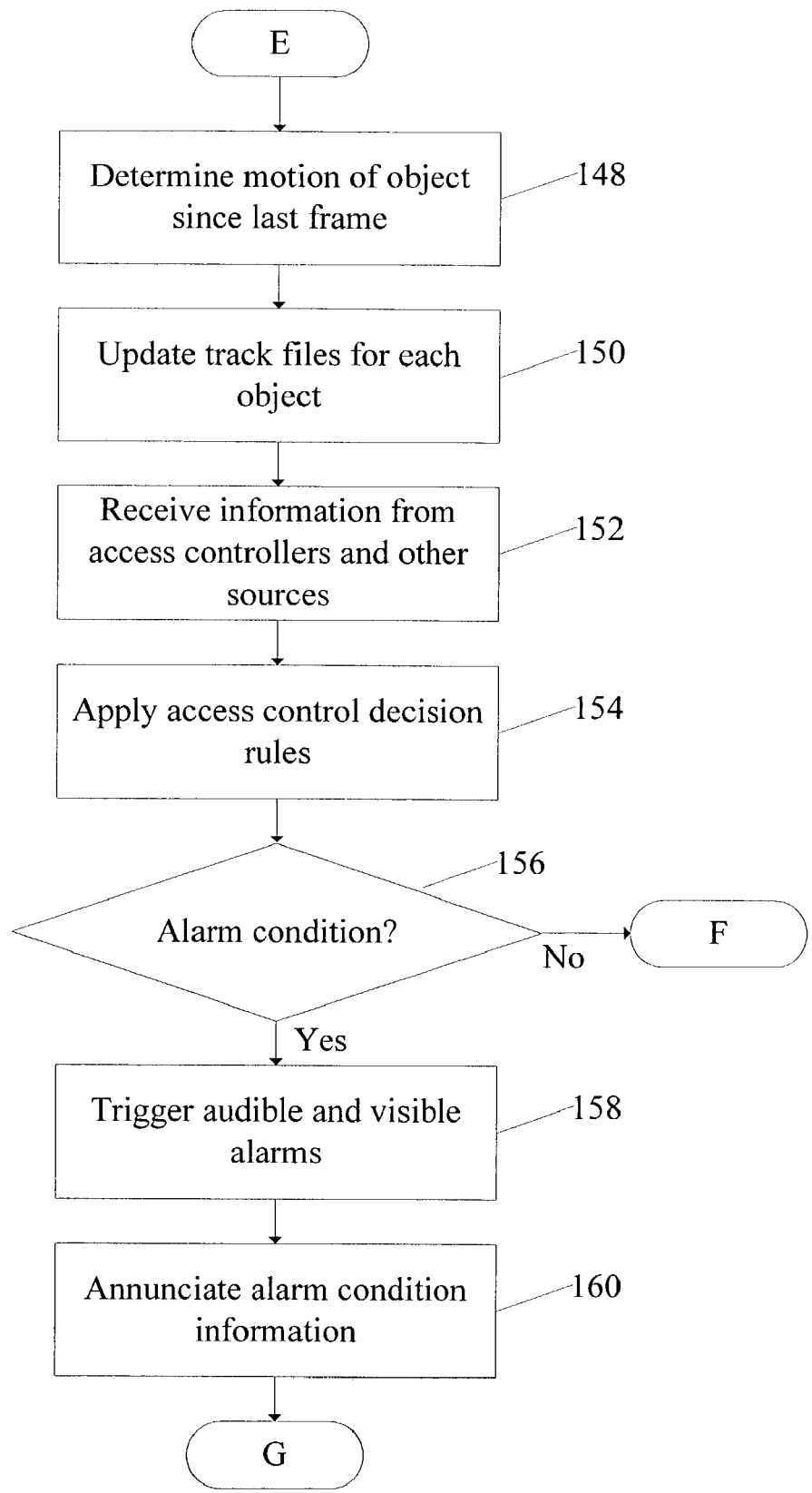
Figure 3E:
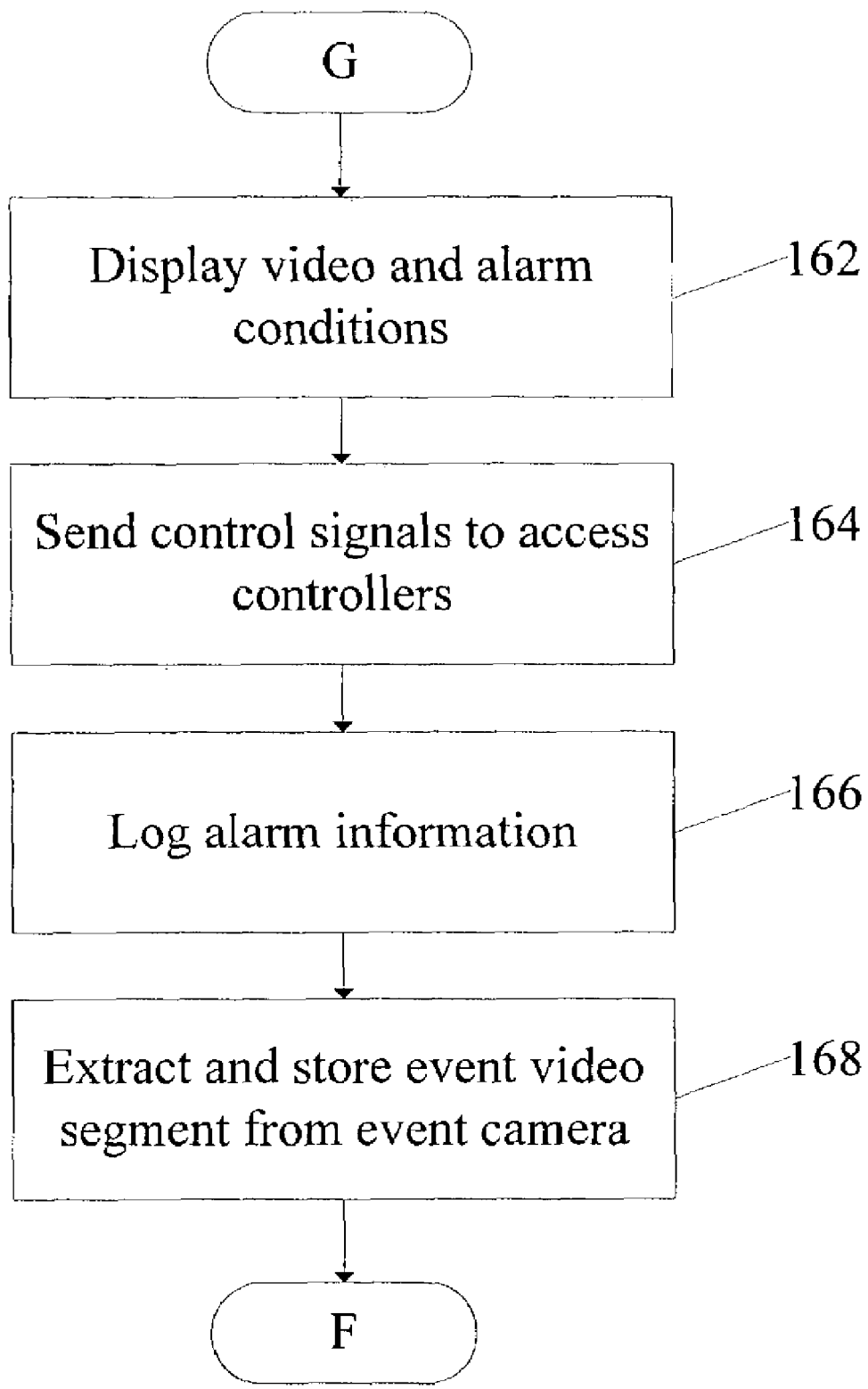
Figure 3F:
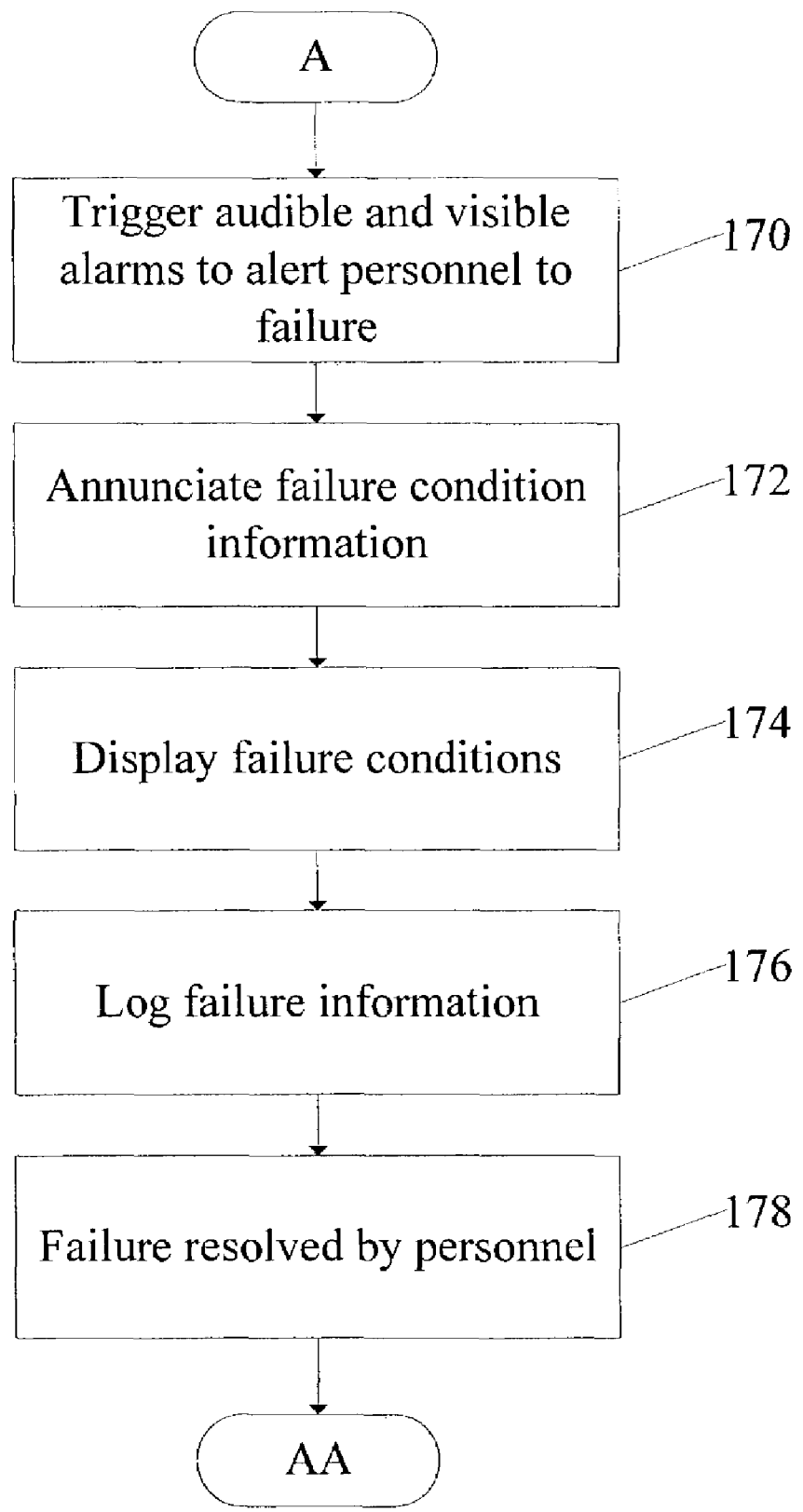

Turning now to FIG. 3D, the motion of each object in the image is determined with respect to those objects in the previous frame, as indicated at block 148, and the track files for the objects are updated at block 150. At block 152, the machine vision processing system 10 receives available information from external sources such as the area or local access controllers 24 and 22. Based on the images, the track files for the objects, and data from the access controllers, access control rules as previously discussed are applied at block 154 to determine at decision block 156 if there is an alarm condition. For example, the locations of one or more objects entering one side of the area of observation 16 and leaving at another side of the area of observation are recorded in the track file. This information along with access credentials and other access control information can be used to determine if tailgating (piggybacking) or reverse entry is occurring. At the same time, information for an object in the track file and the possible lack of connection to other objects can be used to determine if thrown objects have traversed the area of observation in violation of access control rules. In some embodiments, objects are identified as being thrown based on their speed and/or trajectory of motion through the area of observation.

If there is an alarm condition, the machine vision processing system 10 triggers audible and visible alarms at block 158, and optionally annunciates alarm condition information at block 160 using the alarms and annunciators 26 (FIG. 1). At the same time, pertinent video and alarm condition information for the area of observation 16 may be displayed at block 162 (FIG. 3E) using the video display 28. If required, control signals or data indicating the alarm condition and possible required actions are sent to the area and local access controllers 24, 22 as shown at block 164. Alarm information maybe logged at block 166 for future analysis as required and relevant video segments obtained from the event camera 14 maybe saved along with other event information at block 168 by the video recorder 32.

If an unexpected change in the background image or other errors occurs at block 128 (FIG. 3B), the machine vision processing system 10 preferably triggers audible and visible alarms at block 170 (FIG. 3F), to alert personnel of the failure. The machine vision processing system 10 may also annunciate the failure condition at block 172 and display the failure condition information at block 174 using the alarms and annunciators 26, the operator interface 30, and possibly the video display 28. The failure information is logged at block 176 for later analysis if required. The failure may be resolved by an operator or technical personnel at block 178 who then reinitializes the system at block 100 (FIG. 3A).

Figure 3G:
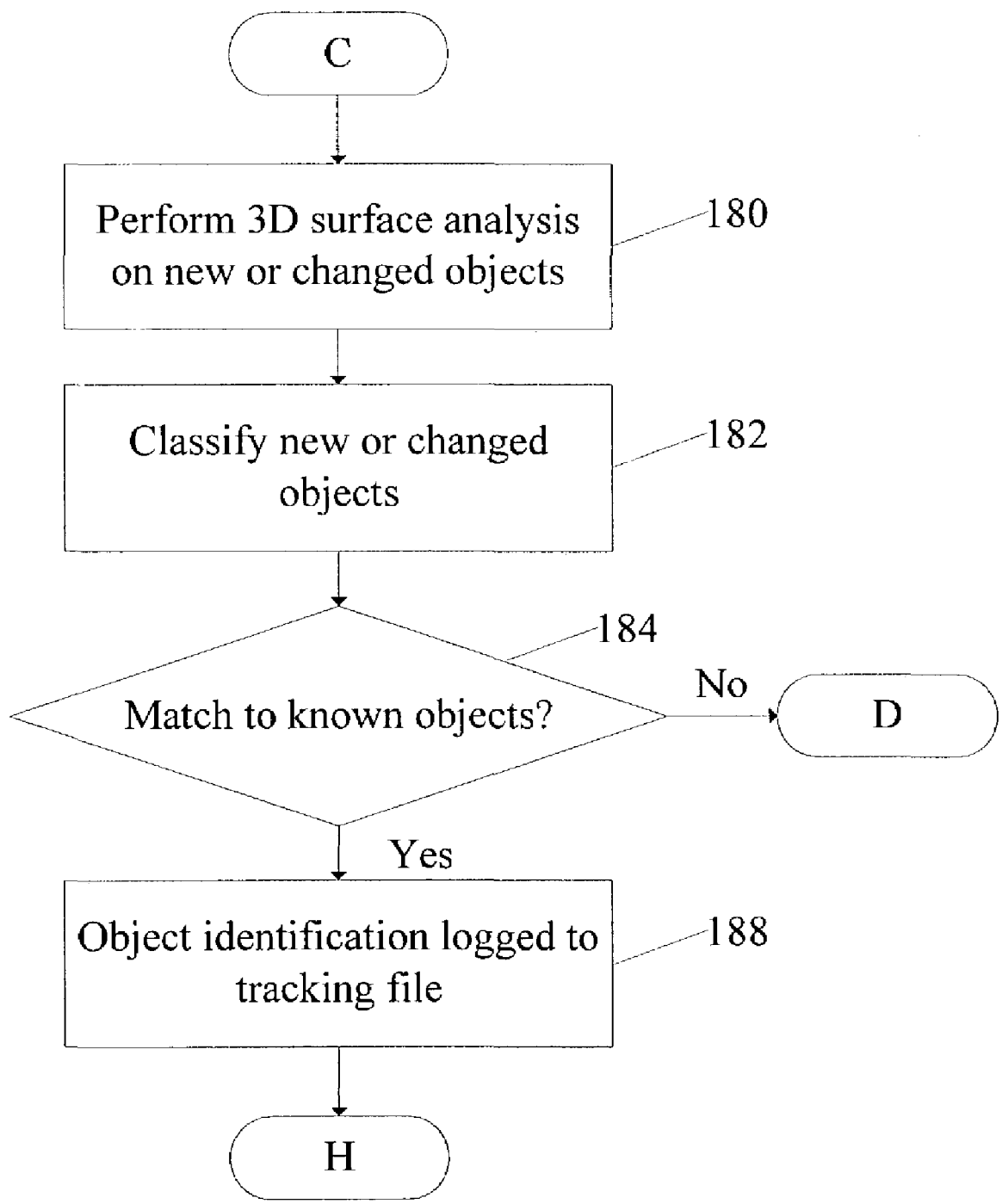
Figure 3H:
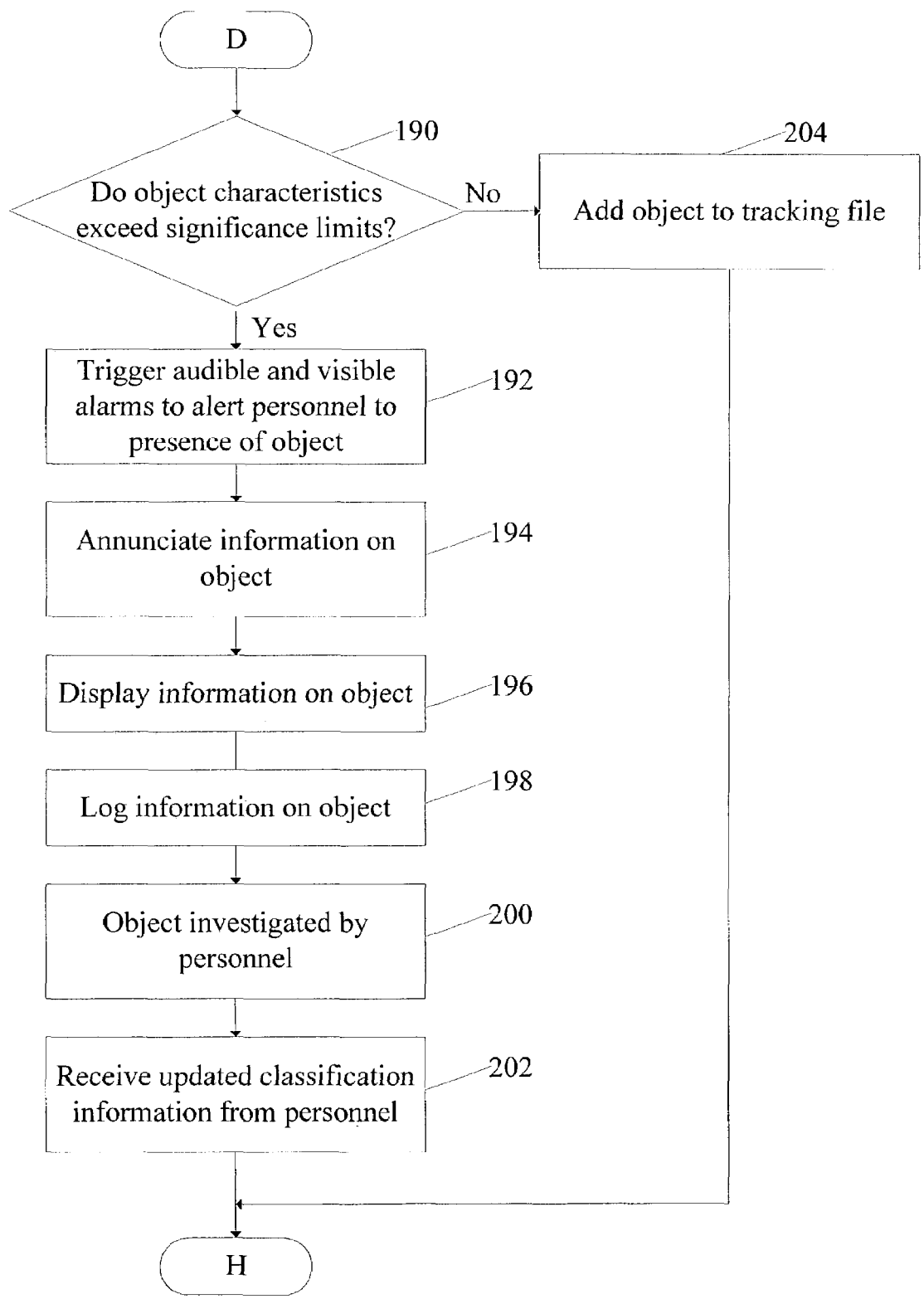

Whenever a new object 18 or unexpected change in an object 18 is detected in the image, as indicated at block 138 (FIG. 3C), the stereo image analysis performed at block 124 is performed for these objects at block 180 (FIG. 3G). This analysis, as noted earlier, preferably includes 3D surface analysis. Based on the 3D surface analysis (and possibly also features extracted as in block 122 with other image characteristics), the new object is classified at block 182, which may use pattern recognition or matching methods, as discussed earlier. If the object is determined to match a known object type or types, as indicated at block 184, the object identification and object characteristics and position are logged to a tracking file as indicated at block 188.

If a new or changed object 18 cannot be matched to one of known characteristics, as indicated at decision block 184, the characteristics of the object are tested at block 190 (FIG. 3H) to determine if the changes exceed significance limits with respect to either the object previously identified or with respect to known image classification data. This situation may arise, for example, when an object or some characteristic of the object appears to change more than a certain amount from one image to the next. If these limits are not exceeded, the object position and characteristic information is added to or updated in the track file at block 204.

If characteristics of the new or changed object 18 do exceed the significance limits at block 190, and thus cannot be satisfactorily classified or has changed characteristics to an unacceptable degree, the machine vision processing system 10 triggers audible and visible alarms at block 192 to alert personnel of the existence of the unexpected or ambiguous object or change in object. The system 10 may also annunciate information at block 194 about the object and its location using the alarms and annunciators 26. Information about the object, its location and other data, such as personnel identification or access codes, may further be displayed at block 196, along with video from the event camera 14, using the video display 28. Information on the unknown object is logged at block 198 as required for later investigation. Personnel may investigate the object, as indicated at block 200, and if desired, enter updated classification information at block 202 using the operator interface 30. This updated information will typically be used to improve or extend the classification of common objects.

In some embodiments, a reverse entry detection system can be identical to a piggyback detection system, but configured with access control rules that, when applied, do not accept any object travelling in a certain direction. Thus, any attempt by a person, object or vehicle to pass through the area of observation in a certain direction (e.g., entering the area through an exit-only portal) will trigger an alarm.

In some embodiments, the machine vision processing system 10 may have the ability to directly control the door 20 or other access limiting device. In other embodiments, the machine vision processing system 10 may indirectly control the door or other access limiting device by sending signals to the area access controller 24 and/or local access controllers 22. This alternative configuration does not change the functionality, scope or spirit of the invention. Examples of these controls can include the following:

1. The machine vision processing system can close and perhaps lock the door.
2. The machine vision processing system can directionally lock (perhaps after closing) the door (i.e. allowing exits but not entrances).
3. The machine vision processing can close and lock (or directionally lock) one or both of the doors in a man-trap (see discussion below regarding a seventh embodiment of the invention).
4. The machine vision processing system can stop and perhaps reverse a rotating door or escalator.

In some embodiments, the machine vision processing system 10 may receive information from a position sensor attached to the door 20 or access limiting device. The position sensor may be comprised of known electronic components that produce a variable signal based upon the position of the door. For example, when the door is closed, the position sensor may encode and transmit one signal, and when open, encode and transmit another signal. Door positions of a partially open door may also be encoded and transmitted so the relative position of the door is known to the system 10. The machine vision processing system 10 can use this door position information to make inferences on the background image in the area of observation 16 by a priori predicting where the image of the door should be seen. During calibration, position sensor information received for various positions of objects, such as a door, may be correlated and recorded for determining the background image that is used during normal run-time analysis.

Stereo Image Analysis

Examples showing the results of a stereo image analysis as described above are provided in FIGS. 4A, 4B, 4C, 4D, 4E, 4F, 4G and 4H. These images depict the outcome of a real-time 3D surface analysis performed by the machine vision processor 10 shown in FIG. 2. In this particular embodiment, the lighter the shade of the image, the closer the surface is to the vantage point of the stereo tracking camera pair 12.

Figure 4A:
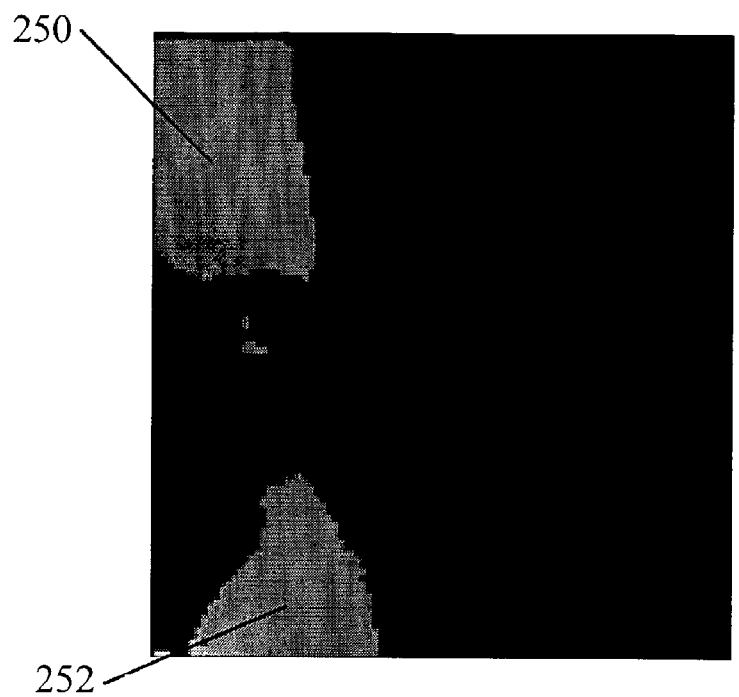
FIGS. 4A, 4B, 4C, 4D, 4E, 4F, 4G, and 4H depict examples of stereo image analysis performed by the embodiment of the invention shown in FIG. 1.

FIG. 4A depicts the results of a 3D surface analysis of a background image. Two objects 250, 252, are seen in this image, each of which are classified as part of an open door that has swung into the field of view. As discussed above, one or more background images are captured and saved for reference. These background images are used for self-test purposes to prevent unauthorized tampering with the background.

Figure 4B:
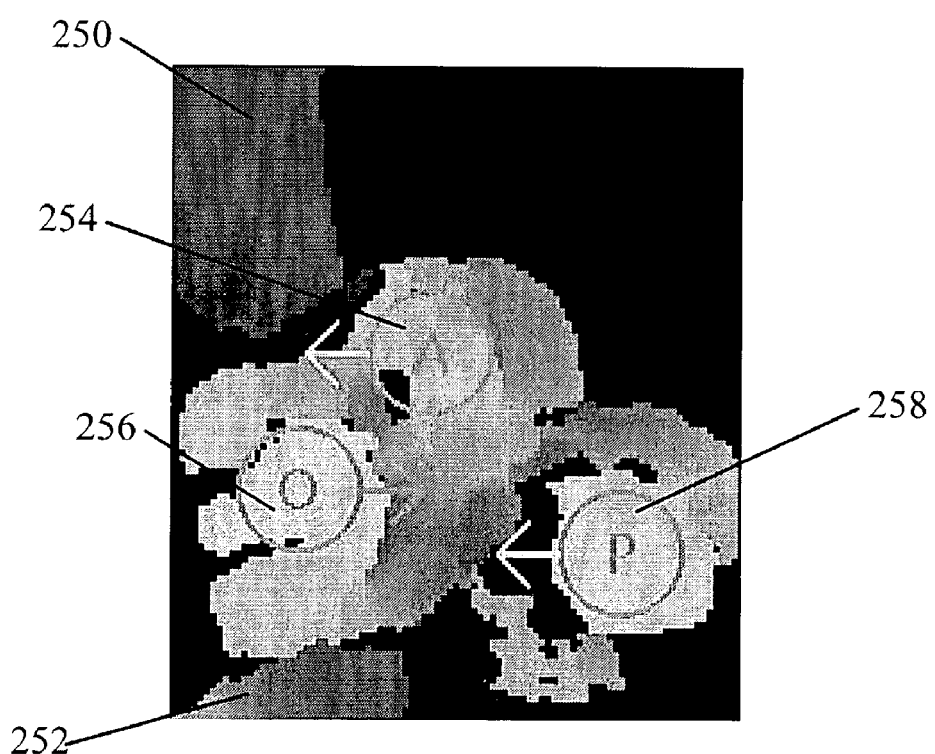

FIG. 4B depicts a real-time 3D surface analysis of the same background as shown in FIG. 4A (including the door objects 250, 252), now with three people present in the area of observation. For convenience of illustration, the three people are labeled here as "A" 254, "O" 256, and "P" 258. The arrows associated with the letter labels indicates each person's direction of motion as determined by the machine vision processing system 10. It will be understood that the machine vision processing system 10 can identify, classify, and track an essentially arbitrary number of moving objects within the field of view. Not only can the machine vision processing system 10 determine and evaluate direction of motion, but also the speed and/or trajectory of each object's motion using known techniques.

Figure 4C:
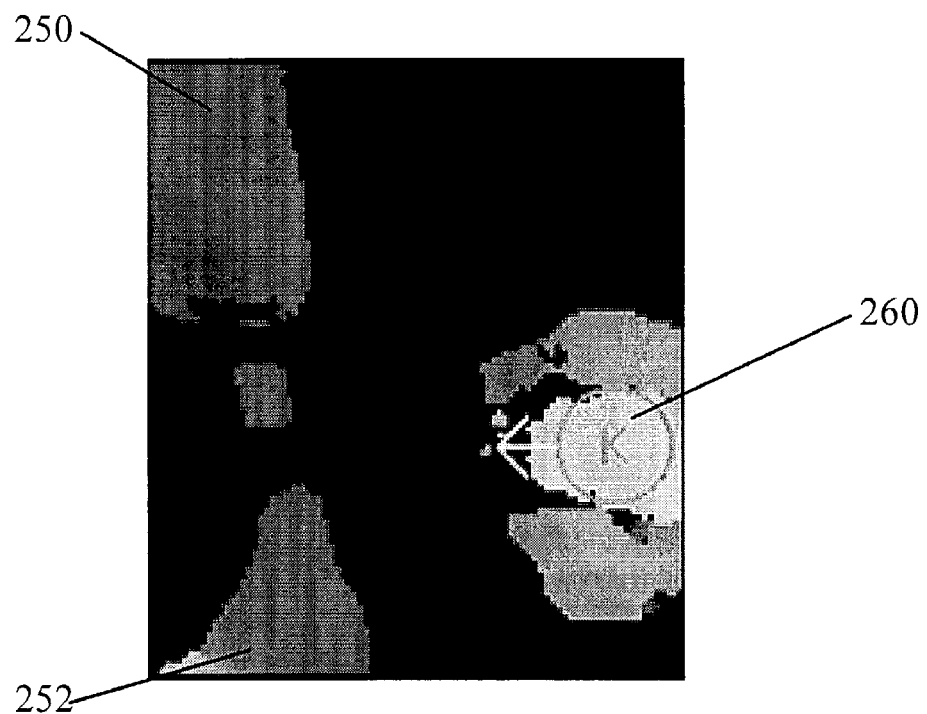
Figure 4D:
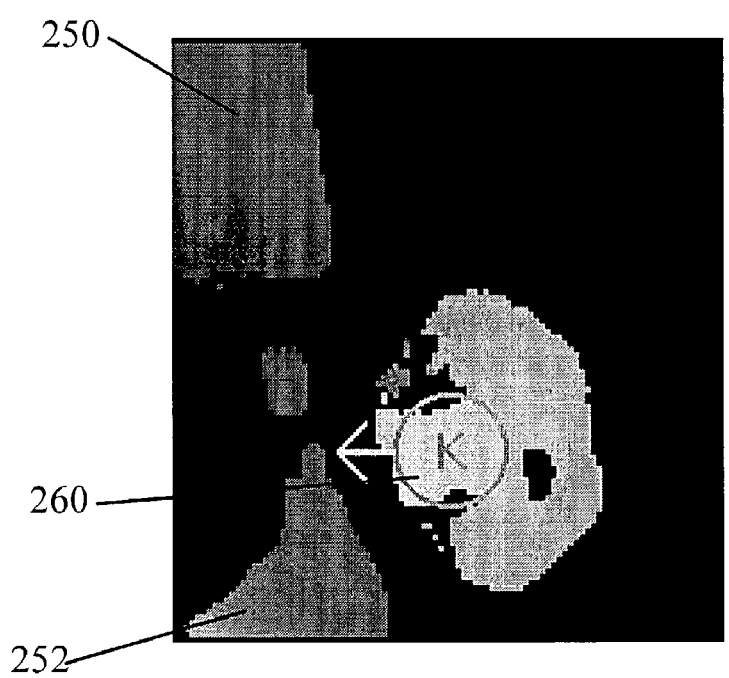

FIG. 4C depicts a 3D surface analysis of the background image (FIG. 4A) with a single person 260 entering the field of view. This person has been identified and classified by the machine vision processing system 10 and is labeled here with the letter "K". FIG. 4D depicts the same field of view and background image as FIG. 4C, but the person 260 has moved a few steps. In this case, the person is being tracked as he or she is entering the controlled access area.

Figure 4E:
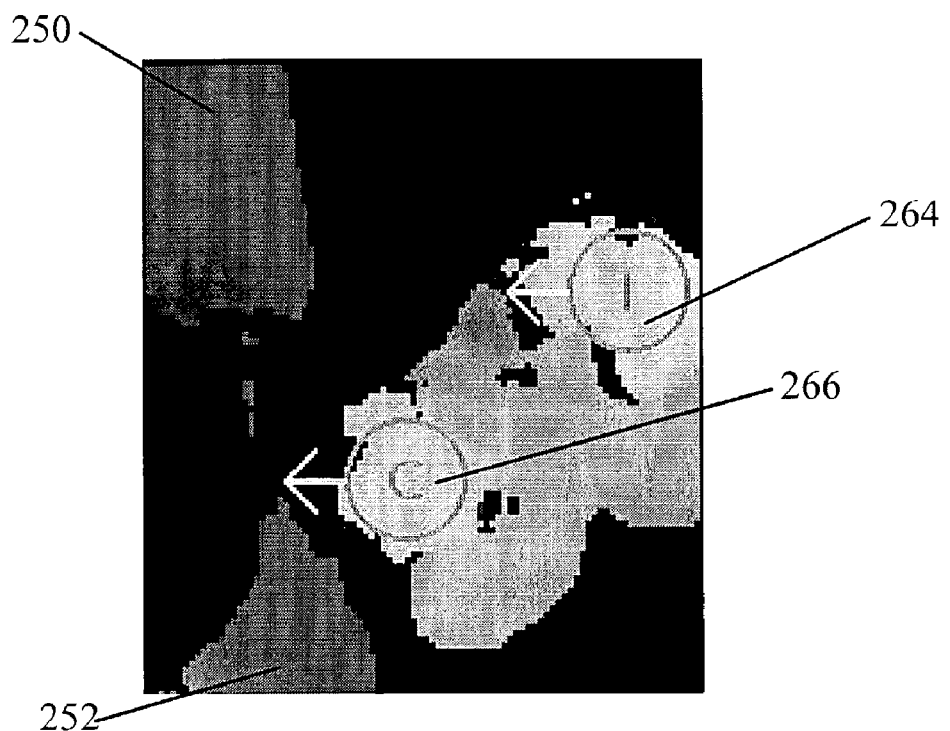
Figure 4F:
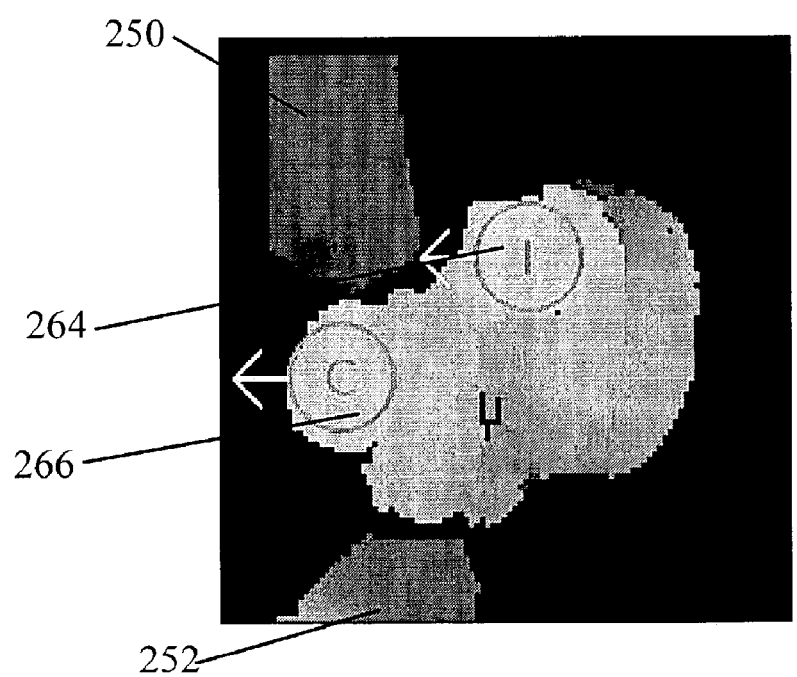

FIG. 4E depicts the results of a 3D surface analysis of the background image (FIG. 4A) with two people 264, 266 (respectively labeled "I" and "C"), traveling in the same direction to the left. FIG. 4F depicts the same field of view and background image as FIG. 4E with the two people 264, 266, having moved further to the left. This example illustrates a typical tailgating situation where the first person 266, labeled with the letter "C" and presumably having correct credentials for the controlled access area, is being closely followed by a second person 264, here labeled with the letter "I".

Figure 4G:
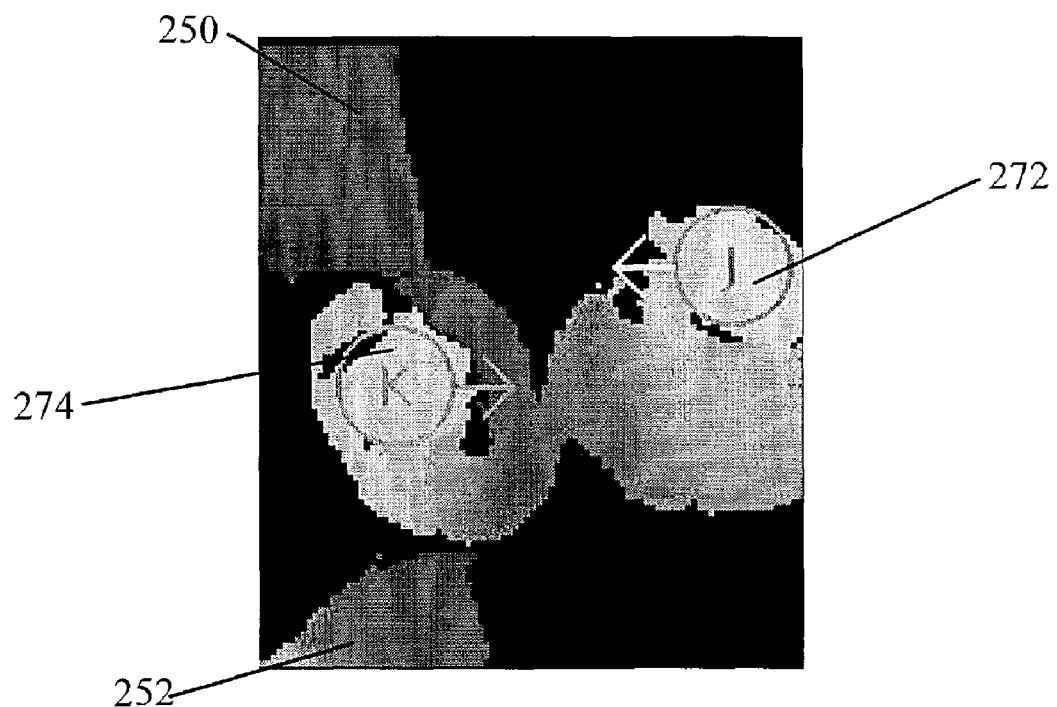
Figure 4H:
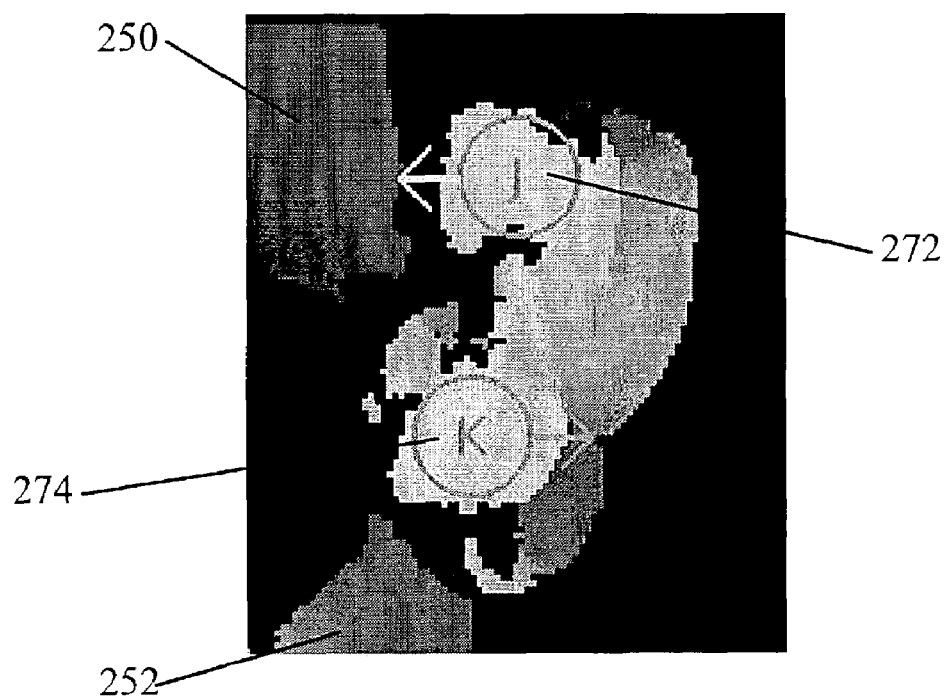

FIG. 4G depicts the results of a 3D surface analysis of the background image (FIG. 4A) with two people 272, 274 respectively labeled "J" and "K", traveling in opposite directions. FIG. 4H depicts the same field of view and background image as FIG. 4G with the two people 272, 274, having moved further in their respective directions. This example illustrates a typical reverse entry situation where the first person 274, labeled with a "K" and presumably having correct credentials for the controlled access area, is exiting the controlled area while the second person 272, labeled with the letter "J", attempts to maintain proximity to the first person 274 and enter while the exit door is still open.

Operator Interface

In some embodiments, one or more operators can interact with the machine vision processing system 10 through an operator interface 30. Some possible functions of the operator interface 30 have already been discussed. FIGS. 5A, 5B, 5C, 5D, and 5E provide one example of a set of interactive screen displays for an operator interface 30. In will be understood that the organization of the operator interface shown in FIGS. 5A, 5B, 5C, 5D, and 5E is an example only, and that many possible arrangements for the functionality of the operator interface 30 are available. Further, additional functionality can be added to the interface 30, or alternatively, functionality shown may not be required in all cases.

Figure 5A:
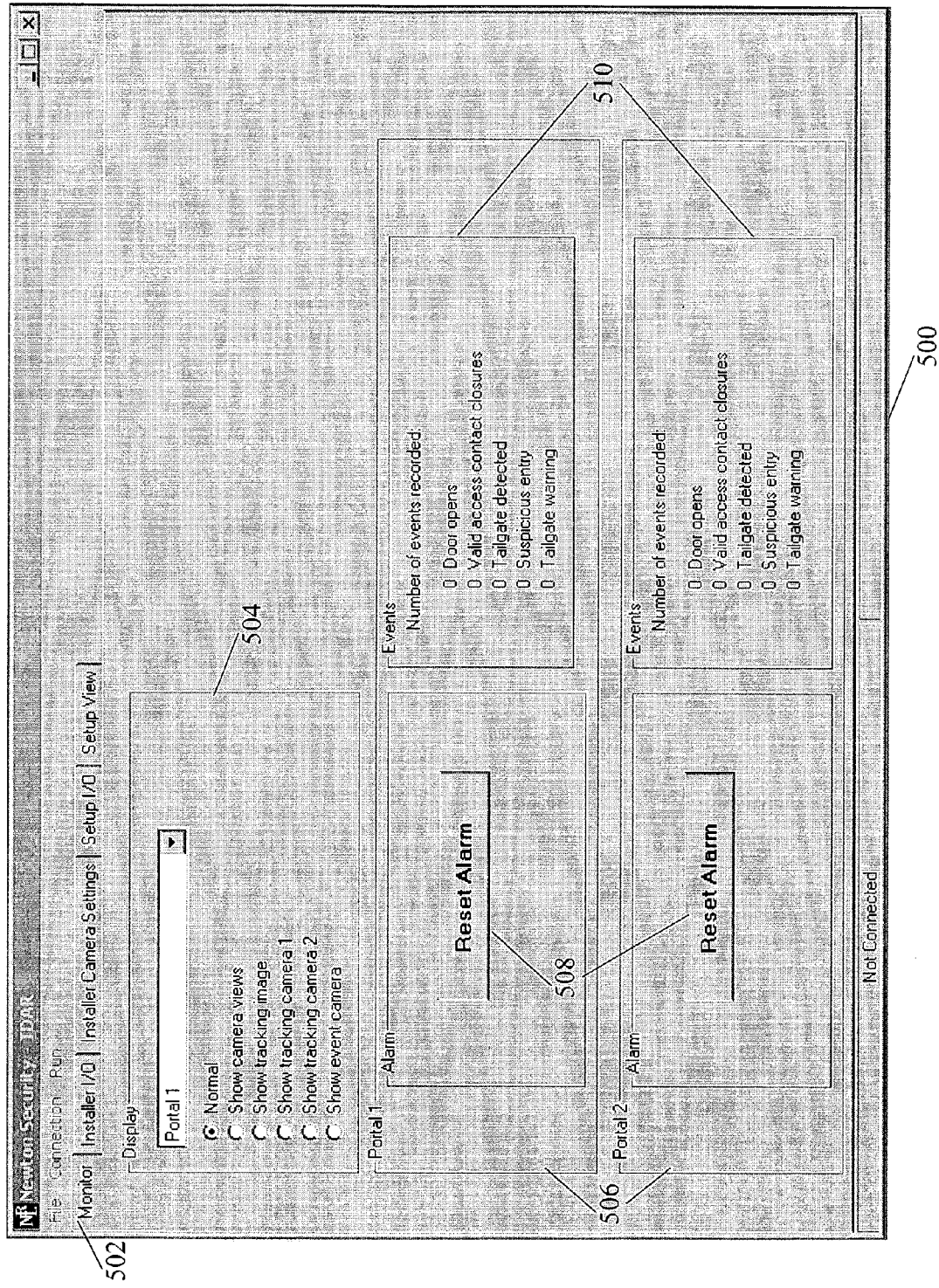
FIGS. 5A, 5B, 5C, 5D, and 5E depict an example of a set of interactive displays for an operator interface.

FIG. 5A depicts an interactive display screen 500 of the operator interface 30, with the "Monitor" tab 502 selected. This interactive display is used to monitor the operation of the machine vision processing system 10. A display control area 504 interacts with the operator to select the designated access point (e.g., portal) for monitoring, particularly in cases where the machine vision processing system 10 is monitoring more than one portal. In this example, the properties of the view displayed can be selected using the radio buttons labeled "Normal", "Show camera views", "Show tracking image", "Show image tracking camera 1", "Show image tracking camera 2", and "Show event camera". In some embodiments, the one or more views chosen will be routed to the video display 28. For each portal, one or more sets of alarm statistics for alarm events 510 can be displayed. A reset 508 for the event statistics can be provided for each of the portals. These statistics can also be saved in a log file for further analysis.

Figure 5B:
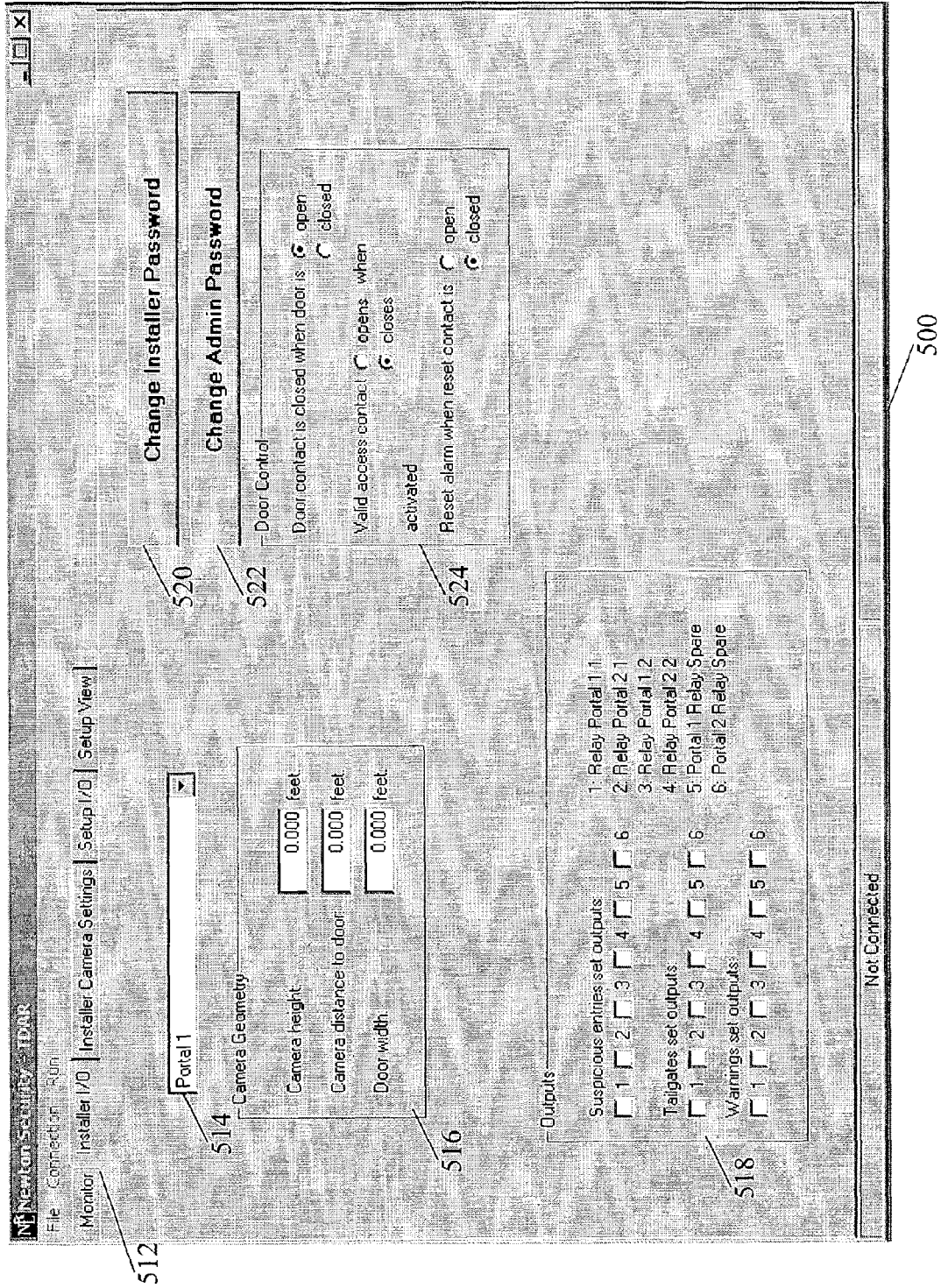

FIG. 5B depicts the "Installer I/O" tab 512 of the interactive display 500. This interactive display can organize functionality useful to personnel installing and maintaining the system of the invention. Using the Installer I/O screen, a user can select between one or more possible portals 514 as required. Parameters required for correcting the images for camera geometry 516 can be entered interactively, possibly including, "Camera height", "Camera distance to door" and "Door width". The trigger for one or more possible types of "Outputs" 518 from the machine vision processing system 10 can be selected in a "cross-connect" fashion based on any of the one or more inputs. In this example, the outputs include, a) suspicious entry, b) tailgates, and c) warnings, and the inputs can include one or more relays (four in the example shown) from the one or more portals.

The machine vision processing system 10 can have multiple levels of security or password access. In this example, three levels of password-controlled security are used:

1. A general user level, typically used by security personnel.
2. An installer level, with complete access to all system configuration capabilities and the ability to administer all levels of accounts.
3. An administrator level, with limited configuration privileges, but with the ability to administer user (e.g. security personnel) accounts.

The Installer I/O display 512 of the interactive operator interface 500 can be used to change the installer password 520 or the administrator password 522. The Installer I/O interactive display can be used to configure properties for alarm sensors 524, which may include, for example, whether the door contact is closed when the door is "open" or "closed", whether a valid access contact "opens" or "closes" the door when activated, and whether the alarm is reset when the reset contact is "open" or "closed".

Figure 5C:
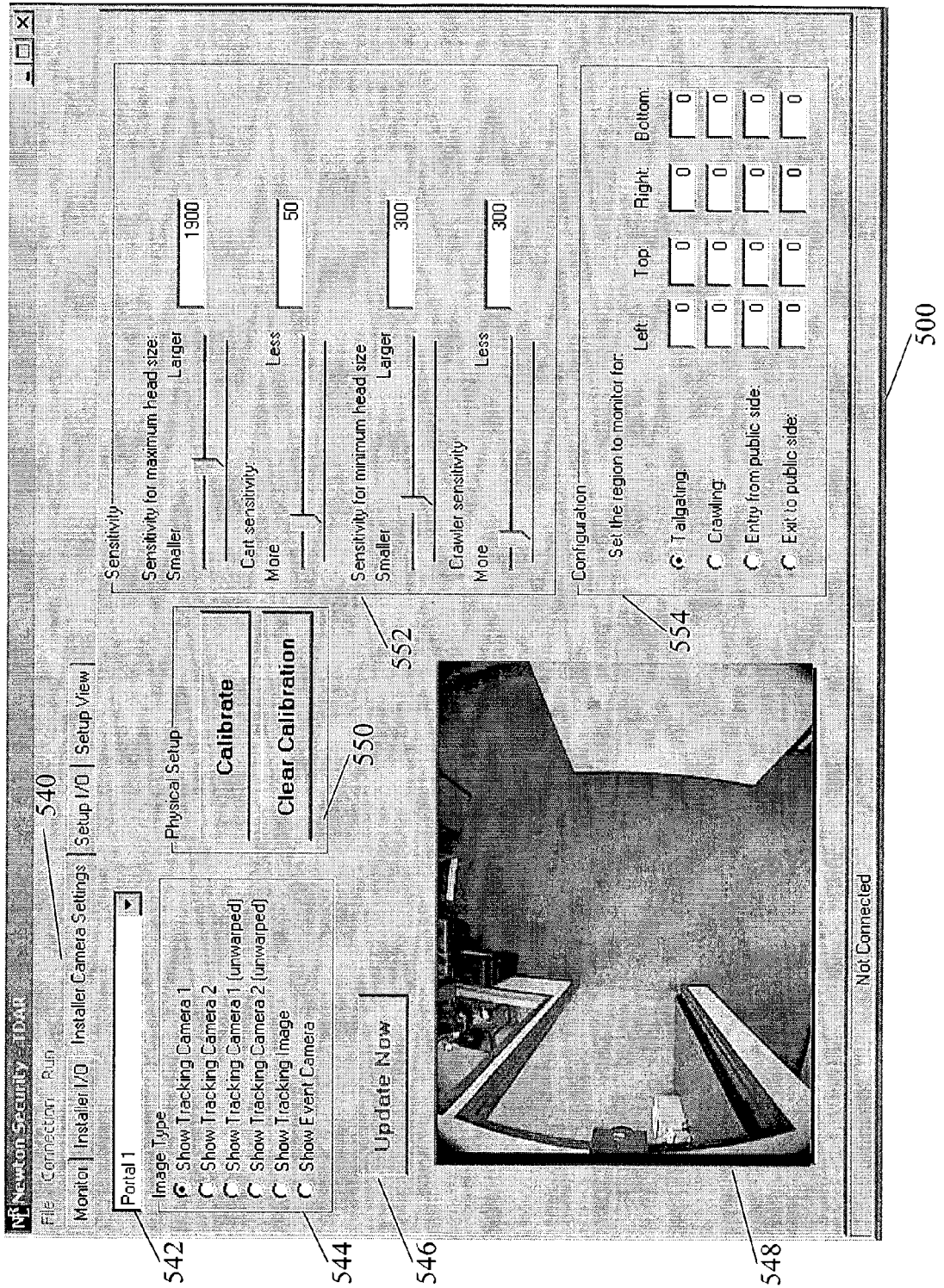

FIG. 5C depicts the "Installer Camera Settings" tab 540 of the interactive display 500. This set of interactive tools is typically used by installation or maintenance personnel to configure machine vision parameters, often in conjunction with functionality on the "Installer I/O" tab 512. A display control area 542 allows the operator to select the portal for monitoring interaction, for cases where the machine vision processing system 10 is monitoring more than one portal. In this example, the "Image Type" 544 of the view displayed can be selected using the radio buttons labeled, "Show Tracking Camera 1", "Show Tracking Camera 2", "Show Tracking Camera 1 (unwarped)", "Show Tracking Camera 2 (unwarped)", "Show Tracking Image," and "Show Event Camera". In some embodiments, the one or more Image Type views chosen may be routed to the built-in display 548. Updates to camera properties can be invoked using the "Update Now" 546 button.

The "Physical Setup" 550 or calibration may be controlled from this screen. A calibration process, used to calibrate the machine vision processing system 10 with respect to the background, is initiated using the "Calibrate" button. As discussed earlier, objects in the background image are identified and registered as pertaining to the background so they do not interfere with run-time identification and analysis of new objects entering and leaving the field of view. The "Clear Calibration" button allows the user to remove an old calibration before creating a new one. One or more "Sensitivity" 552 settings, used by the machine vision processing system to identify objects in the image, can be adjusted with the Installer Camera Settings tab 540. In this example, a slider control and a numeric display are used for these sensitivity settings including:

1. The maximum head size used as a filter for the accurate identification of people.
2. Cart sensitivity, used to properly identify moving carts or other objects on wheels or slides.
3. The minimum head size used as a filter for the accurate identification of people.
4. Crawler sensitivity, used to determine when a person is crawling in an attempt to evade the system.

One or more "Configuration" 554 parameters may be used to restrict the portion of the area of observation 16 within which the machine vision processing system 10 searches for one or more types of behavior. In this example, the types of behavior to search for are selectable and numeric parameters setting the limits of the zones within the area of observation may be established. In alternative embodiments, an interactive tool can be used to select the search zones by drawing on an image, for example.

Figure 5D:
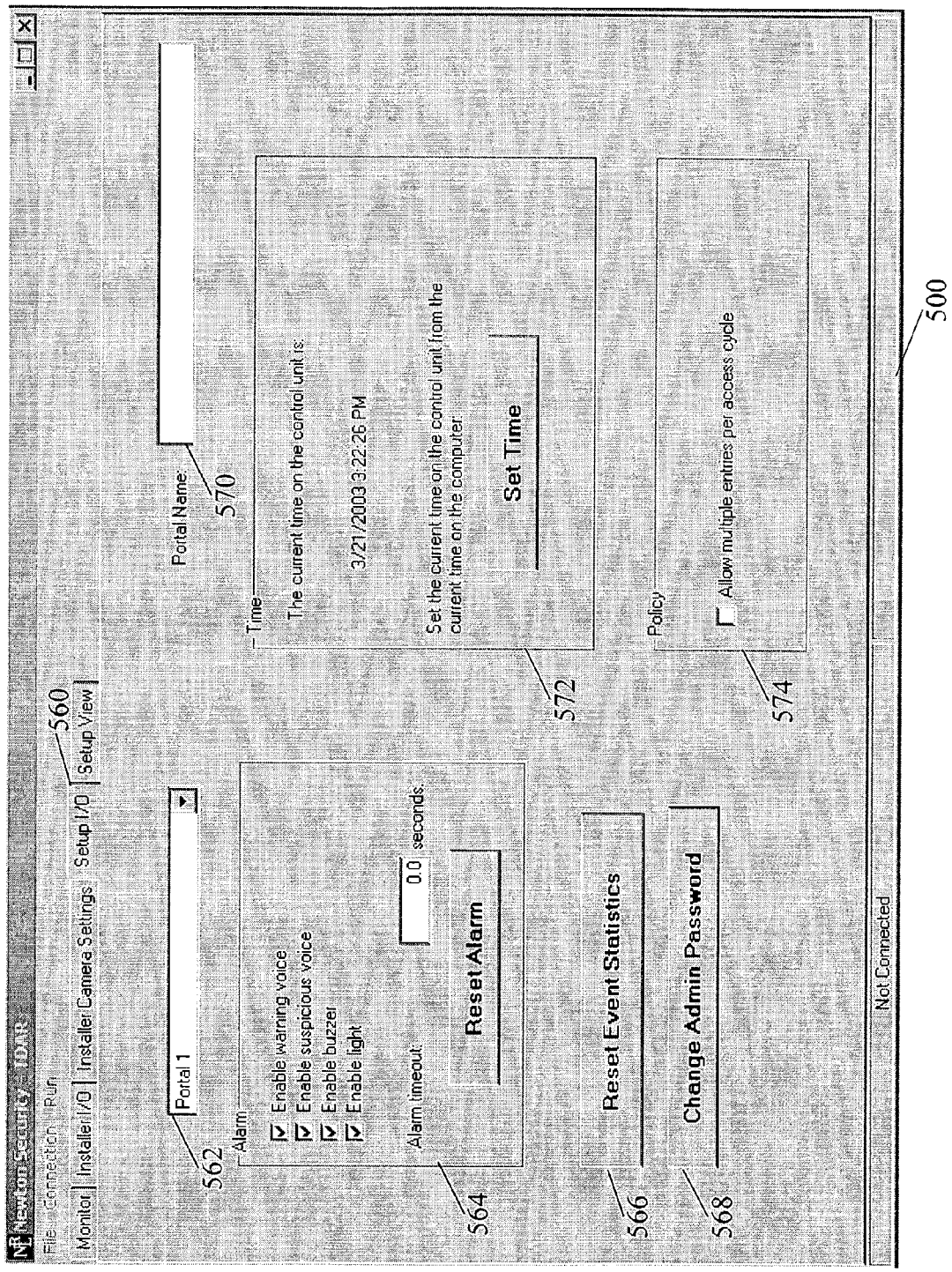
Figure 5E:
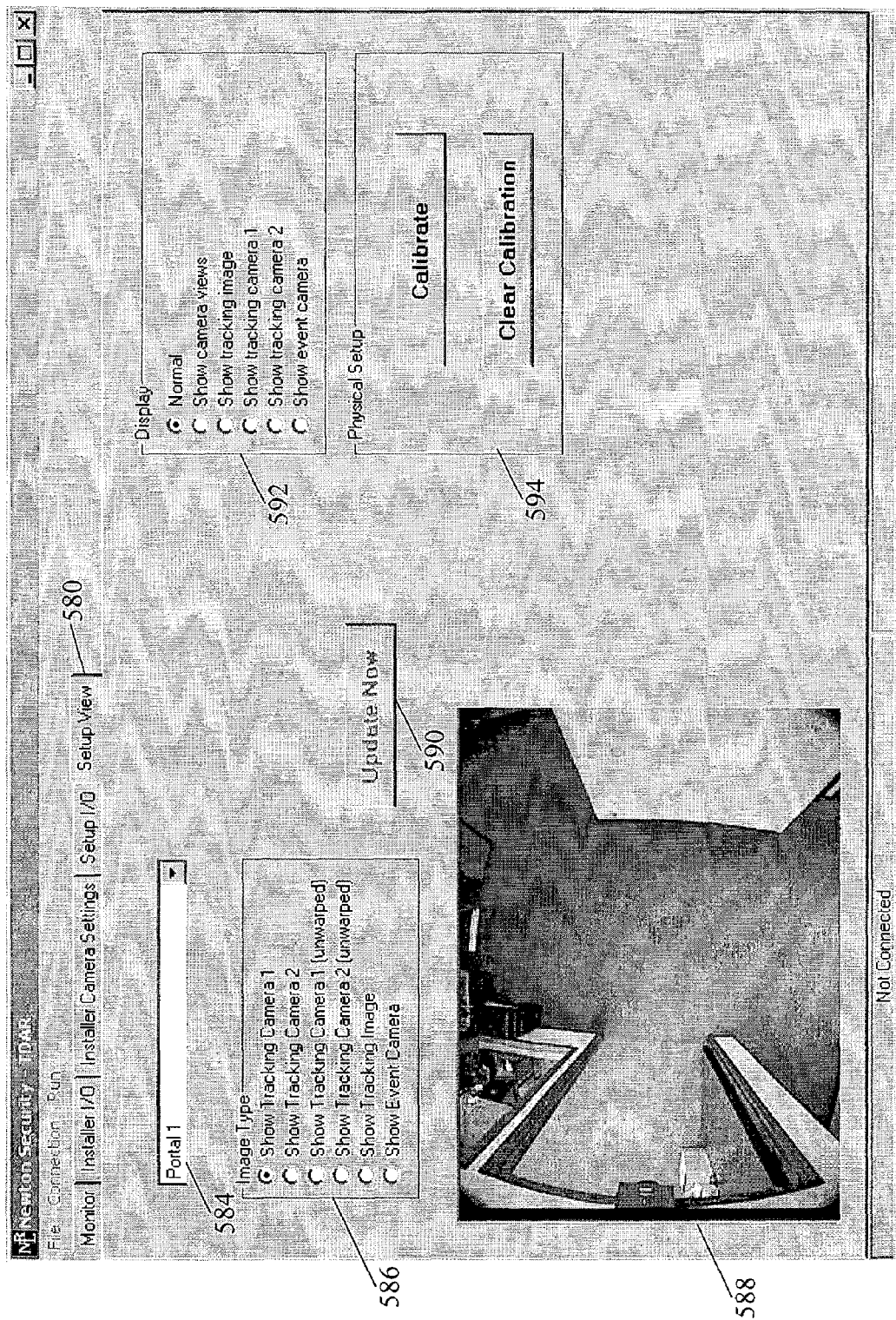

FIG. 5D depicts the "Setup I/O" tab 560 of the interactive display 500. This set of interactive tools is typically used by installation or maintenance personnel to configure the I/O properties of the machine vision processing system 10, often in conjunction with functionality on the "Installer I/O" 512 tab and the "Installer Camera Settings" tab 540. Using the "Setup I/O" screen 560, a user can select between one or more portals 562 as required. The types of "Alarms" 564 enabled can be set. In this example, four choices are available including, a) warning voice, b) suspicious voice, c) buzzer, and d) light. A timeout time for the alarm can be set and a "Reset Alarm" button can be used to reset the alarm state. The "Reset Event Statistics" button 566 resets the alarm statistics for the portal. A system administrator can change the password using the "Change Admin Password" button 568. Portals can be assigned a name using a text box 570. Time on the area access controller 24 or local access controller 22 can be read and set with a "Time" control tool 572. Moreover, one or more "Policy" 574 properties can be selected. In this example, there is provided an option to allow multiple entries (or people) per access cycle. Other applicable policies may also be displayed and selected.

FIG. 5D shows the "Setup View" tab 580 of the interactive display 500, which is used to set camera views and calibrate the machine vision processing system 10. A portal selection 584 allows the operator to select the portal for setup, for cases where the machine vision processing system 10 is monitoring more than one portal. The "Image Type" 586 of the view displayed can be selected using the radio buttons labeled, "Show Tracking Camera 1", "Show Tracking Camera 2", "Show Tracking Camera 1 (unwarped)", "Show Tracking Camera 2 (unwarped)", "Show Tracking Image," and "Show Event Camera", for this example. In some embodiments, the one or more Image Type views chosen will be routed to the built-in display 588. Updates to camera properties can be invoked using the "Update Now" 590 button. The properties of the view "Display" 592 can be selected using the radio buttons labeled, "Normal", "Show camera views", "Show tracking image", "Show tracking camera 1", "Show tracking camera 2", and "Show event camera", in this example. In some embodiments, the one or more views chosen will be routed to the video display 28. The "Physical Setup"594 or calibration can be controlled from this screen. A calibration process, used to calibrate the machine vision processing system 10 with respect to the background, may be initiated using the "Calibrate" button. The "Clear Calibration" button allows the user to remove an old calibration before creating a new one.

Second Embodiment

A second preferred embodiment operates in much the same manner as the first embodiment, which has already been described in detail. To reduce cost, the second embodiment uses a single camera in place of the stereo tracking camera pair 12 that is used in the first embodiment. This embodiment loses the benefits of stereoscopic image analysis and 3D surface analysis, but still can use other machine vision methods including, motion tracking, background differencing, image segmentation, texture analysis, and shape analysis. Alternatively, a gray scale (non-color) camera may be used as a further cost reduction, but losing the benefits of color analysis. These alternative embodiments retain all other functionality and scope of the first embodiment for detection and reporting of tailgating or reverse entry events.

Third Embodiment

A third preferred embodiment operates in much the same manner as the first embodiment, which has already been described in detail. To reduce cost, the third embodiment uses gray scale cameras in place of the color stereo tracking camera pair 12 and color event camera 14 used in the first embodiment. This embodiment loses the benefits of color analysis, but still uses machine vision methods, including stereoscopic image and 3D surface analysis, to classify and track objects and determine whether their presence and/or activity is authorized. In a further alternative, a gray scale (non-color) camera is used for the event camera 14 and color cameras are used for the stereo camera pair 12. This alternative retains the benefits of color analysis for the object identification and tracking capability, and only reduces the cost and capability of the event camera. These alternative embodiments retain all other functionality and scope of the first embodiment for detection and reporting of tailgating or reverse entry events.

Fourth Embodiment

A fourth preferred embodiment extends the functionality of the first embodiment by providing two or more pairs of stereo tracking cameras 12 and/or two or more event cameras 14 to an area of observation 16. The fourth embodiment operates in much the same manner as the first embodiment, which has already been described in detail, but with an improved ability to resolve certain ambiguous situations. An example of an ambiguous situation is where one object fully or mostly obscures another object from the point of view of the first set of cameras. Another advantage of this extended embodiment is the ability to better identify and classify objects since stereoscopic analysis (including, but not limited to, 3D surface analysis) can be performed from more than one vantage point. This alternative extended embodiment retains all other functionality and scope of the first embodiment.

Fifth Embodiment

A fifth preferred embodiment employs the same techniques of the first embodiment, but extends the functionality to include the detection, tracking and alarming of thrown or dropped objects. In some situations, a perpetrator may wish to pass an unauthorized object into a controlled area. The stereo camera 12 tracks any objects that are thrown or dropped in the area of observation 16. In other situations, a perpetrator may wish to leave an unauthorized object in the area of observation. The machine vision processing system 10 tracks the thrown or dropped objects using machine vision techniques that may include, stereoscopic image processing, video motion detection, analysis of connections to other objects (to determine if the object is really traveling through the air or is making some other type of motion, such as being swung by a person), creation and maintenance of track files (to determine the trajectory of the thrown or dropped objects), shape analysis, image segmentation, and pattern recognition (to identify the type of object being dropped or thrown). In some embodiments, the machine vision processing system 10 may determine if the dropped or thrown object is entering or leaving the controlled area, and may trigger an alarm only if the object is entering the controlled area (or vice versa, exiting the controlled area). In cases where the machine vision processing system 10 determines that a thrown or dropped object is entering (or exiting) the controlled area, or passing through or remaining in the area of observation, in violation of the established access control rules, the alarms or annunciators 26 can be triggered.

Sixth Embodiment

A sixth preferred embodiment extends the functionality of the first embodiment to the counting of people or objects entering or leaving a controlled area. The stereo camera 12 tracks any number of people or objects entering or leaving the controlled area through the area of observation 16. The machine vision processing system 10 tracks the people or objects using machine vision techniques that may include, stereoscopic image processing, video motion detection, analysis of connections to other objects (to determine which people or objects are moving independently of others), creation and maintenance of track files (to, determine for example, if a person or an object has really entered or left the controlled area or merely entered the area of observation, turned around and left the area of observation traveling in the other direction), shape analysis, image segmentation, and pattern recognition (to identify and classify the type of object traveling though the area of observation). In some embodiments, the machine vision processing system is interfaced with the area access controller 24 or local access controller 22. In this case, the machine vision processing system can identify a number of situations in which security procedures may not be followed correctly including:

1. A person or object (i.e. a vehicle of some type) that is authorized to enter or leave the controlled area by the area access controller or local access controller but does not actually enter or leave the controlled area. In this case, the machine vision processing system can notify the area access controller or local access controller that the authorized person or objects have not actually entered or left the controlled area as expected. These controllers can then appropriately update their state (e.g., noting which persons or objects are within the controlled area).
2. The machine vision processing system 10 can count the numbers of persons or objects (possibly of specific types) that have entered or left a controlled area. This information can be used by, for example, security personnel or an access controller to determine how many people or objects are within the controlled area at any one time.
3. The area of observation can be around a fire door or other emergency exit or other portal that is not ordinarily used. In normal circumstances, no person or object would pass through this door or portal. In case of an emergency, any number of people or objects (e.g. vehicles) may pass through. The machine vision processing system 10 can then count the number of people or objects (and perhaps type) leaving the controlled area. In some embodiments, the machine vision processing system 10 will notify the area access controller or the local access controller of these activities, and if the rules governing the controlled area are violated, then trigger the alarms and annunciators.
4. In some situations, people or objects (such as vehicles) may receive authorization to enter or exit the controlled area, possibly from the area access controller or local access controller, but may not actually enter or exit the controlled area. In this case, the area access controller or local access controller can notify the machine vision processing system 10 of the number of persons and objects (perhaps including information indicating the types of objects) authorized to enter or exit the controlled access area and cross the area of observation 16. In some cases, a period of time is allowed for the authorized persons or objects to enter or exit (e.g. a timeout is set). If the persons or objects are not observed to enter (or exit) the controlled access area, the machine vision processing system 10 can notify the area access controller or local access controller of these activities. The controller may then not allow the authorization to enter (or exit) to be repeated. The controllers can also prevent the repeated use of security credentials or pass codes to exit (or enter) when the authorized person or object has not actually used the first authorization, or prevent the same credentials or codes from being used for multiple entrances (or exits) when no exits (or entrances) have been recorded. In some embodiments, the machine vision processing system 10 can trigger the alarms and annunciators when these access control rules are violated.

Seventh Embodiment

A seventh preferred embodiment extends the functionality of the first embodiment, which has already been described in detail, by adding a second door or other access-limiting structure at the end of a passage (and typically at the end of the area of observation 16). This configuration creates a "man trap" or vehicle trap to contain the perpetrator of a tailgating or reverse entry attempt in a defined area. Preferably, the local access controllers 22 for both doors or access-limiting structures are under the control of the machine vision processing system 10. This arrangement allows the system 10 to automatically contain the perpetrator until security personnel have a chance to investigate the incident. This alternative extended embodiment retains all other functionality and scope of the first embodiment.

Other embodiments and uses of the invention will be apparent to those skilled in the art from consideration of the specification and practice of the invention disclosed herein. The specification and examples herein should be considered exemplary only, with the scope of the invention indicated by the following claims and equivalents thereto. As will be readily understood by those of ordinary skill in the art, variations can be made within the scope of the invention as defined by the following claims.

The invention claimed is:

1. A method for detecting a violation of security of a controlled access area, comprising:
    (a) acquiring one or more stereoscopic images of an area of observation, wherein objects in the area of observation are characterized by (1) an object type and (2) an authorization status indicating whether the object is authorized with respect to the controlled access area;
    (b) analyzing the one or more images using a machine vision processing system to identify a first object in the area of observation and to classify the first object in a first object type among a plurality of object types that are pre-defined in the machine vision processing system, said first object having supplied an authorization with respect to the controlled access area, and further using the machine vision processing system to identify a second object in the area of observation and to classify the second object in a second object type among the plurality of pre-defined object types, wherein the authorization status of each of the objects is determined separately from classifying the object in an object type; and
    (c) applying one or more access control rules to the information obtained from the image analysis to determine whether the second object is attempting to breach the controlled access area by utilizing the authorization supplied by the first object in violation thereof,
    wherein the controlled access area is limited to objects that are classified in a defined object type and have a status that is authorized with respect to the controlled access area, and
    wherein the one or more access control rules determine whether the second object is attempting to breach the controlled access area by separately determining (1) whether the classification of the second object is in the defined object type and (2) whether the second object has a status that is authorized with respect to the controlled access area.

2. The method of claim 1, in which the one or more access control rules determine whether the second object is attempting to breach the controlled access area based on proximity of the second object to the first object in the area of observation.

3. The method of claim 2, in which the authorization of the first object is to enter the controlled access area, and the one or more access control rules determine whether the second object is attempting to enter the controlled access area by maintaining proximity to the first object as the first object enters the controlled access area.

4. The method of claim 2, in which the authorization of the first object is to exit the controlled access area, and the one or more access control rules determine whether the second object is attempting to enter the controlled access area by maintaining proximity to the first object as the first object exits the controlled access area.

5. The method of claim 1, in which analyzing the one or more images further comprises using the machine vision processing system to identify motion of the first object and the second object.

6. The method of claim 5, in which the one or more access control rules determine whether the second object is attempting to breach the controlled access area based on motion of the second object relative to the first object.

7. The method of claim 6, in which the one or more access control rules determine whether the second object is following the motion of the first object with respect to the controlled access area.

8. The method of claim 1, further comprising triggering an alarm when the one or more access control rules determine that the second object is attempting to breach the controlled access area.

9. The method of claim 1, further comprising, in response to determining that the second object is attempting to breach the controlled access area, causing an access limiting device associated with the controlled access area to prevent the breach of the controlled access area by the second object.

10. The method of claim 9, in which causing the access limiting device to prevent the breach of the controlled access area comprises causing the access limiting device to block passage by the second object with respect to the controlled access area.

11. The method of claim 9, in which causing the access limiting device to prevent the breach of the controlled access area comprises locking the access limiting device.

12. The method of claim 9, in which the access limiting device has a normal direction of operation and in which causing the access limiting device to prevent the breach of the controlled access area comprises reversing the direction of operation of the access limiting device to be opposite the normal direction of operation.

13. The method of claim 12, in which the access limiting device is a revolving structure and the direction of rotation of the revolving structure is reversed.

14. The method of claim 1, further comprising causing one or more access limiting devices to block passage of the second object and contain the second object within a defined area.

15. The method of claim 1, further comprising receiving access control information from an access control system and applying the one or more access control rules to the access control information in combination with the information obtained from the image analysis to determine whether the second object is attempting to breach the controlled access area.

16. The method of claim 15, further comprising triggering an alarm when the one or more access control rules applied to the access control information and image analysis information determine that the second object is attempting to breach the controlled access area.

17. The method of claim 15, further comprising, in response to determining that the second object is attempting to breach the controlled access area, causing an access limiting device associated with the controlled access area to prevent the breach of the controlled access area by the second object.

18. The method of claim 17, in which causing the access limiting device to prevent the breach of the controlled access area comprises causing the access limiting device to block passage by the second object with respect to the controlled access area.

19. The method of claim 17, in which causing the access limiting device to prevent the breach of the controlled access area comprises locking the access limiting device.

20. The method of claim 17, in which the access limiting device has a normal direction of operation and in which causing the access limiting device to prevent the breach of the controlled access area comprises reversing the direction of operation of the access limiting device to be opposite the normal direction of operation.

21. The method of claim 20, in which the access limiting device is a revolving door and the direction of rotation of the revolving door is reversed.

22. The method of claim 1, in which analyzing the one or more images using a machine vision processing system further comprises using a three-dimensional surface analysis to identify the first or second object.

23. The method of claim 1, in which analyzing the one or more images using a machine vision processing system further comprises using a three-dimensional surface analysis to classify the first or second object.

24. The method of claim 1, in which analyzing the one or more images further comprises determining the presence of a connection between the first and second objects.

25. The method of claim 1, further comprising recording the one or more images.

26. The method of claim 1, further comprising recording information obtained from the image analysis.

27. The method of claim 1, further comprising recording information resulting from applying the one or more access control rules to the information obtained from the image analysis.

28. The method of claim 1, further comprising defining a region of interest within the area of observation.

29. The method of claim 28, further comprising defining a plurality of regions of interest and applying the one or more access control rules based on the region of interest in which the first or second objects are located.

30. The method of claim 28, further comprising using an interactive user interface that displays the area of observation to define the region of interest.

31. The method of claim 1, further comprising using an interactive user interface to configure properties of the image analysis.

32. The method of claim 1, further comprising using an interactive user interface to configure properties of the machine vision processing system.

33. The method of claim 1, further comprising using an interactive user interface to configure properties of an access control system that provides access control information to the machine vision processing system.

34. An apparatus for detecting a security violation with respect to a controlled access area, comprising:
(a) a stereoscopic imaging device for acquiring one or more stereoscopic images of an area of observation, wherein objects in the area of observation are characterized by (1) an object type and (2) an authorization status indicating whether the object is authorized with respect to the controlled access area; and
(b) a machine vision processing system in communication with the stereoscopic imaging device to receive the one or more images, the machine vision processing system being further configured to analyze the one or more images to identify an object in the area of observation and to classify the object in an object type among a plurality of object types that are pre-defined in the machine vision processing system, and apply one or more access control rules to determine whether the object is attempting to breach the controlled access area in violation of security of the controlled access area,
wherein the controlled access area is limited to objects that are classified in a defined object type and have a status that is authorized with respect to the controlled access area, and
wherein the one or more access control rules applied by the machine vision processing system determine whether the object is attempting to breach the controlled access area by separately determining (1) whether the classification of the object is in the defined object type and (2) whether the second object has a status that is authorized with respect to the controlled access area.

35. The apparatus of claim 34, in which the object in the area of observation is a suspect object, the apparatus further comprising a position sensor disposed on a background object in the area of observation, the machine vision processing system being further configured to use information received from the position sensor to define the background object from the suspect object.

36. The apparatus of claim 35, in which the position sensor is disposed on a door.

37. The apparatus of claim 35, in which the machine vision processing system is further configured to perform a calibration procedure that correlates position sensor information to a position of the background object for determining a background image.

38. The apparatus of claim 34, in which the controlled access area has a designated access point, the machine vision processing system being further configured to determine the direction of motion of the object with respect to the designated access point and apply the one or more access control rules to determine whether the object is attempting to breach the controlled access area by using the designated access point in violation of the security of the controlled access area.

39. The apparatus of claim 38, in which the machine vision processing system is further configured to analyze the one or more images to determine the speed of motion of the object and apply the one or more access control rules to determine whether the speed of motion of the object indicates a thrown object.

40. The apparatus of claim 38, in which the machine vision processing system is further configured to analyze the one or more images to determine the trajectory of motion of the object and apply the one or more access control rules to determine whether the trajectory of motion of the object indicates a thrown object.

41. The apparatus of claim 34, further comprising an alarm that is triggered when the one or more access control rules determine that the object is attempting to breach the controlled access area in violation of the security of the controlled access area.

42. The apparatus of claim 34, in which the object in the area of observation is a second object, the machine vision processing system being further configured to identify and classify a first object in the area of observation having supplied an authorization with respect to the controlled access area, and to apply the one or more access control rules to determine whether the second object is attempting to breach the controlled access area by utilizing the authorization supplied by the first object in violation thereof.

43. The apparatus of claim 42, in which the one or more access control rules are configured to determine whether the second object is attempting to breach the controlled access area based on proximity of the second object to the first object in the area of observation.

44. The apparatus of claim 43, in which the authorization of the first object is to enter the controlled access area, and the one or more access control rules are configured to determine whether the second object is attempting to enter the controlled access area by maintaining proximity to the first object as the first object enters the controlled access area.

45. The apparatus of claim 43, in which the authorization of the first object is to exit the controlled access area, and the one or more access control rules are configured to determine whether the second object is attempting to enter the controlled access area by maintaining proximity to the first object as the first object exits the controlled access area.

46. The apparatus of claim 34, further comprising an access control system associated with the controlled access area in which the access control system is configured to receive information from the object for accessing the controlled access area.

47. The apparatus of claim 46, further comprising an access limiting device in communication with the access control system, in which the access control system is configured to control the operation of the access limiting device.

48. The apparatus of claim 34, wherein the stereoscopic imaging device for acquiring the one or more stereographic images is placed directly overhead the area of observation.

49. The method of claim 1, in which the controlled access area is limited to objects classified as vehicles.

50. The method of claim 1, in which the controlled access area is limited to objects classified as packages.

51. The method of claim 1, in which the controlled access area is limited to objects classified as persons.

52. The method of claim 1, wherein if the second object is classified in an object type that is not allowed for the authorization supplied by the first object, the method further comprises actuating an alarm.

53. The method of claim 1, wherein if the second object is classified in an object type that is not allowed for any authorization, the method further comprises actuating an alarm.

54. The method of claim 1, wherein the second object type of the second object is different than the first object type of the first object.

* * * * *